US007034825B2

(12) United States Patent
Stowe et al.

(10) Patent No.: US 7,034,825 B2
(45) Date of Patent: Apr. 25, 2006

(54) COMPUTERIZED IMAGE SYSTEM

(76) Inventors: Jason A. Stowe, 1197 Boylston St., Apt. 103, Boston, MA (US) 02115; Bryan M. Vandrovec, 180 Shawmut Ave. No. 305, Boston, MA (US) 02118; Douglas B. Clayton, 21 Converse Ave., Malden, MA (US) 02148

( * ) Notice: Subject to any disclaimer, the term of this patent is extended or adjusted under 35 U.S.C. 154(b) by 388 days.

(21) Appl. No.: 10/362,389

(22) PCT Filed: Aug. 24, 2001

(86) PCT No.: PCT/US01/26560

§ 371 (c)(1),
(2), (4) Date: Feb. 24, 2003

(87) PCT Pub. No.: WO02/17044

PCT Pub. Date: Feb. 28, 2002

(65) Prior Publication Data

US 2004/0100465 A1      May 27, 2004

Related U.S. Application Data

(60) Provisional application No. 60/227,673, filed on Aug. 24, 2000.

(51) Int. Cl.
*G06T 15/30* (2006.01)

(52) U.S. Cl. .................. 345/423; 345/419; 345/427; 345/428; 345/440

(58) Field of Classification Search ................ 345/419, 345/421, 423, 427, 426, 428, 440, 582
See application file for complete search history.

(56) References Cited

U.S. PATENT DOCUMENTS

| | | |
|---|---|---|
| 5,025,400 A | 6/1991 | Cook et al. |
| 5,384,901 A | 1/1995 | Glassner et al. |
| 5,450,550 A | 9/1995 | Ito et al. |
| 5,459,835 A | 10/1995 | Trevett |
| 5,488,700 A | 1/1996 | Glassner |
| 5,495,576 A | 2/1996 | Ritchey |
| 5,515,483 A | 5/1996 | Ito et al. |
| 5,550,641 A | 8/1996 | Shashua et al. |
| 5,561,752 A | 10/1996 | Jevans |
| 5,594,844 A | 1/1997 | Sakai et al. |
| 5,598,482 A | 1/1997 | Balasubramanian et al. |
| 5,598,517 A | 1/1997 | Watkins |
| 5,704,024 A | 12/1997 | Voorhies et al. |
| 5,714,997 A | 2/1998 | Anderson |
| 5,734,368 A | 3/1998 | Meyers et al. |
| 5,745,636 A | 4/1998 | Shashua et al. |
| 5,745,660 A | 4/1998 | Kolpatzik et al. |
| 5,764,228 A | 6/1998 | Baldwin |
| 5,764,243 A | 6/1998 | Baldwin |
| 5,777,608 A | 7/1998 | Lipovski et al. |
| 5,790,132 A | 8/1998 | Watson |

(Continued)

*Primary Examiner*—Kimbinh T. Nguyen
(74) *Attorney, Agent, or Firm*—Tiajoloff & Kelly

(57) ABSTRACT

This system and process for providing a rendered image of a virtual 3-D scene comprises an image generating system which stores therein data defining the 3-D scene. Responses to receiving control data such as viewing parameters, editing commands, or instructions to a software application working with the scene data, the visualization systems renders a pixel data image of the scene and transmits the pixel data over a data network, such as the Internet, to a user computer to be viewed on a display device, such as a monitor.

61 Claims, 25 Drawing Sheets

U.S. PATENT DOCUMENTS

| | | |
|---|---|---|
| 5,798,770 A | 8/1998 | Baldwin |
| 5,808,617 A | 9/1998 | Kenworthy et al. |
| 5,821,944 A | 10/1998 | Watkins |
| 5,835,096 A | 11/1998 | Baldwin |
| 5,933,146 A | 8/1999 | Wrigley |
| 5,973,699 A * | 10/1999 | Kent .......................... 345/419 |
| 5,999,944 A | 12/1999 | Lipkin |
| 6,057,847 A | 5/2000 | Jenkins |
| 6,289,299 B1 | 9/2001 | Daniel Jr. et al. |
| 6,314,452 B1 | 11/2001 | Dekel et al. |

* cited by examiner

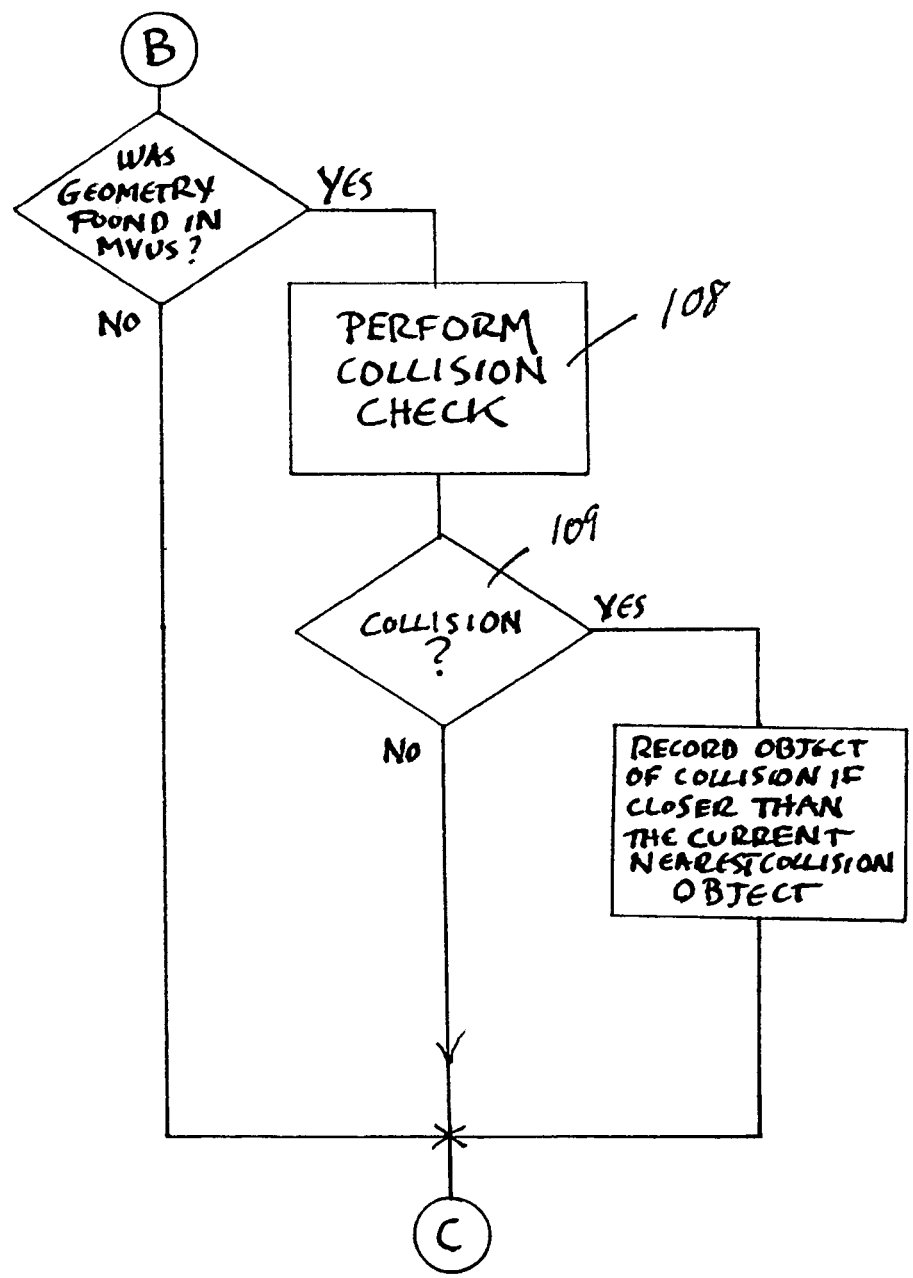
Fig. 12A, cont'd

COMPUTERIZED IMAGE SYSTEM

This application claims the benefit of Provisional Application No. 60/227,673, filed Aug. 24, 2000.

FIELD OF THE INVENTION

This invention relates to the field of electronic transmission of computer generated images, and, more particularly, to systems and methods by which computers interact over a computer data network to transfer data for displaying computer-rendered images for viewing by a user.

BACKGROUND OF THE INVENTION

Computer data networks, and particularly the Internet, allow users to access software on separate computers located either nearby or at great distances from the user. These remotely-accessed software applications sometimes involve display to the user of computer-rendered images which represent views of virtual three-dimensional scenes.

A number of systems have been developed which provide for fairly quick turnaround time for preparation and display of rendered images of virtual scenes. The rate of image rendering can even be fast enough that images can be rendered in sequence at a rate that can approximate or achieve real-time graphics interaction of the user with the remote application.

The most common of these high-speed graphics rendering systems are based on dedicated "graphics pipeline" hardware in the user's computer. In these graphics pipeline systems, the remote application server transmits simple scene data over the network to the user computer. This scene data typically comprises data defining a group of triangles, or "primitives", that make up the objects of the three-dimensional scene. At the user computer, the scene data is sent to a separate graphics pipeline circuit board of the user computer, such as Open GL graphics H/W sold by Silicon Graphics or NVIDIA.

The graphics hardware renders a rasterized image representing a view of the virtual scene from the scene data by a series of discrete and independent computation steps. The circuit performs these computation steps like an assembly line, or "pipeline", or parallel calculations in which several images are simultaneously proceeding through the circuitry in varying states of completion. This circuit provides for rendering of serial images separated by close increments of time, which provides a flow of images that is fast enough to approximate sequential frames of video.

Unfortunately, although images can be rendered fairly quickly and close together by graphics pipeline hardware, the resulting images are very coarse and unrealistic. For example, usually the image does not contain any shadows, and the surfaces have an unrealistically uniform quality.

At the same time, increasing demand for more complex scenes is increasing the amount of scene data needed for a 3-D scene, which places even greater demands on the limited power of pipeline graphics cards. Improvements in communications protocols have increased data transmission rates, but the amount of scene data that is desired for transfer is becoming prohibitively large, despite these increases. As an example, the actual image pixel data for frames of the film "Star Wars: the Phantom Menace" each represented about 25 megabytes of data, while the scene data that defined the scenes ran as high as approximately 10 to 15 gigabytes of data, i.e., hundreds of times larger.

SUMMARY OF THE INVENTION

It is therefore an object of the present invention to provide a method and a system that provides for interactive rendering of images for three-dimensional scenes over data networks, preferably with turnaround times that are suitable for real-time interactivity.

According to the methods and systems of the present invention, a user computer transmits control data over a computer data network, such as the Internet, to an image generating computer system. The image generating system automatically uses the control data to influence scene data defining a three dimensional scene and/or optical parameters for viewing the defined scene.

Instead of transmitting the scene data to the user computer for rendering an image using the user's system, as has been done in the pipeline graphics systems of the prior art, the image generating system renders pixel data at a location remote from the user, which data represents a view of the three-dimensional scene based on the scene data and the viewing parameters. The image generating system transmits the pixel data of the image over the data network to the user computer, and the user computer then displays the pixel data to the user as a viewable image.

The pixel data may be for a single image, transmitted as raw pixel data, or in a compressed form, such as in JPEG format. In the preferred embodiment, however, images are rendered by the image generating system in a continuing stream and transmitted for viewing as real-time interactive video, preferably in MPEG format.

This system is particularly advantageous where the size of the scene data needed to render the pixel image exceeds the size of the data package needed to define the pixel image, and where the computational power required to render the pixel image within an acceptable turnaround time exceeds the computational capacity of the user system.

Preferably, a large number of users are connected with the image generating system, and these users may be widely distributed geographically. To improve real-time operation, the image generating system preferably includes a discrete geometric system that maintains the scene data. The geometric system is connected by very high-speed, high volume data transmission lines to a number of separate, geographically distributed visualization systems. Each visualization system communicates with a respective user computer over the data network, and is preferably located close in the network to the user computer to reduce latency in the network communications links.

To further improve access of the visualization systems to the scene data in a widely distributed system, the geometric system may be made up of a plurality of geographically distributed computer systems connected by high speed data links.

It is further an object of the invention to provide an image generating system with improved rendering techniques and systems.

It is also an object of the invention to provide a computer-accessible storage device or memory storing a database containing the scene data organized in a way which facilitates the determination of what visual objects are encountered along a path through the scene or in the neighborhood of a location therein.

It is also an object of the invention to provide a method for determining the objects in a scene that lie in a path using the aforesaid stored database.

Other objects and advantages of the invention will become apparent from the specification herein.

BRIEF DESCRIPTION OF THE DRAWINGS

FIG. 6 is a diagram of a scene divided into cells.

FIG. 7 is a diagram as in FIG. 6 with a further subdivision.

FIG. 8 is a diagram as in FIG. 7, showing multiple, virtual uniform subdivision ("MVUS").

DETAILED DESCRIPTION

In the systems and methods here described, an interactive image generating system communicates over a network with users to provide them with images rendered for scene data defining a three dimensional virtual "scene." The image generating system stores the scene data so as to make rendering more efficient, and the rendering process used is also improved by incorporating pipeline-style steps in the software or hardware without sacrificing image quality.

a. The Interactive System

Figure 1:
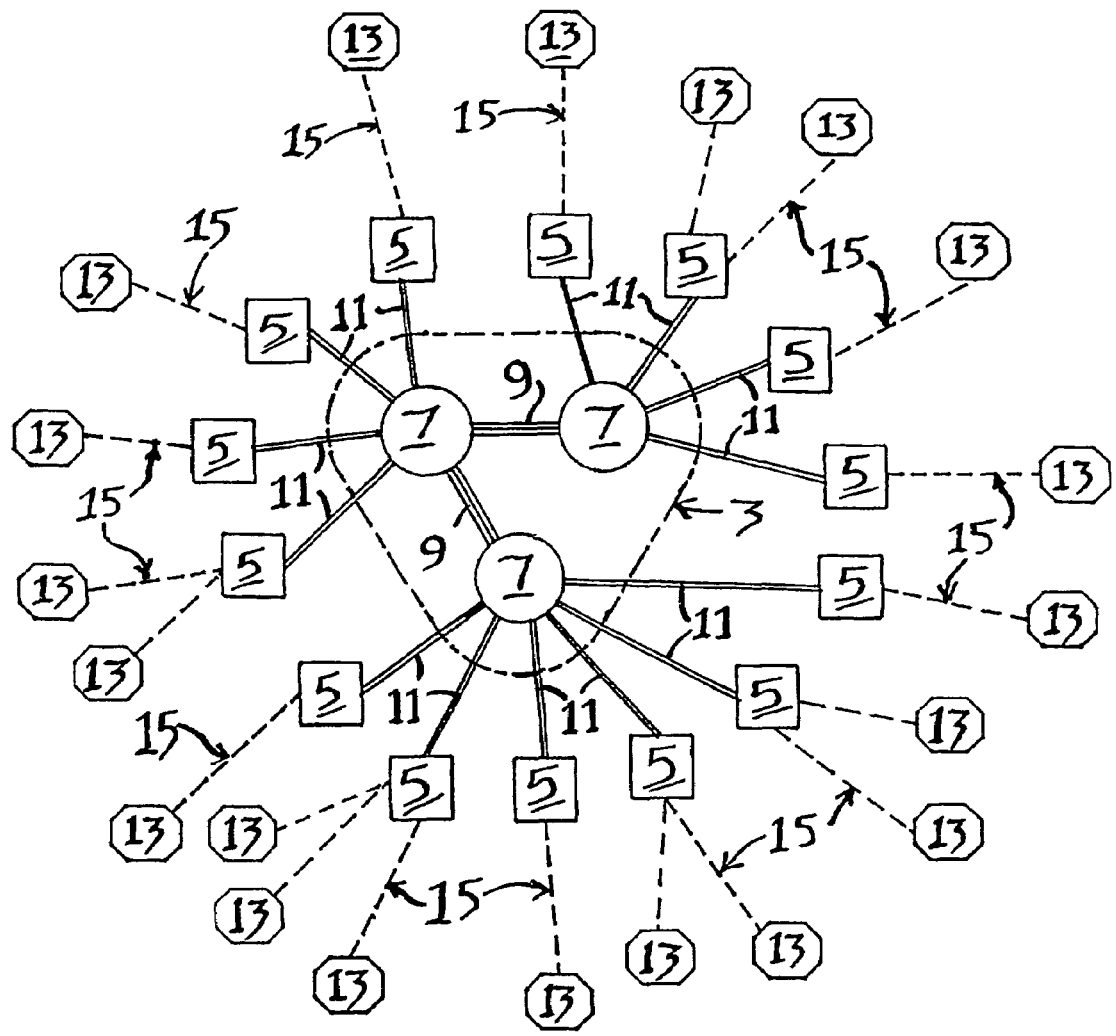
FIG. 1 is a schematic view of the multi-user image generating system of the invention.

As best seen in FIG. 1, a computer image generating and displaying system according to the invention comprises a geometry control system generally indicated at 3 connected with a number of geographically distributed visualization systems 5. Each visualization system communicates over a link 15 via a data network, such as the Internet, with at least one user computer 13.

The geometric control system 3 comprises a number of individual geometry computer systems 7, shown in FIG. 1 to be three systems, but potentially, and preferably much greater in number. The geometry control system 3 maintains and processes scene data which defines one or more three-dimensional scenes from which computer rendered images can be prepared and displayed to the various users 13.

The scene data may be distributed among the geometry computer systems 7 of the geometry control system 3 in a variety of ways. Preferably, each geometry system 7 has scene data for separate scenes, and each geometry computer 7 has access to every scene on the various geometry computer systems 7 via high-speed communications lines 9. When one of the geometry computer systems 7 alters the scene data, it advises the other geometry computer systems 7 of the changes to the scene data being made over communications lines 9, and each geometry system 7 is thus kept up to date.

The high speed data links 9 are preferably dedicated, hard-wired data links that transfer data at an extremely high rate, either on single channels or in parallel, as is well-known in the art. The data links connect all of the geometry systems 7, with each other, either directly or through other geometry systems 7. Alternatively, the geometry system 7 can be in the same network location as a connected visualization computer 5.

The individual geometry computer systems 7 each communicate with the visualization computer systems 5 using further high speed data links 11. Data links 11 are preferably also dedicated hard-wired links which allow for a very high rate of data transmission, preferably on the order of at least about 10 megabits/sec, and more preferably above about a gigabit/sec. The visualization systems 5 may be thousands of miles apart, either within a single country or across international boundaries, or may be clustered together, even in a single installation, where a group of users are close together.

As a result of the distance and number of network hops potentially present, latency even in high-speed communication may be an issue when the communication is via a data network or some other link with an inherent time delay, e.g., a synchronous satellite link. To reduce latency, the individual geometry computers 7 are therefore preferably distributed geographically and located on a data network to be close thereon to the associated visualization computer systems 5, i.e., within at most 2 or 3 network hops of each other.

The visualization computers 5, in turn, are each connected with a respective user computer 13 by computer data network links 15. The linkage 15 may be through individual local area networks (LANs) but are most preferably through the Internet or cellular phone networks. The links 15 may also be telephone or cable TV links between the user computers 13 and the visualization computer 5. As a result, the links 15 to the various user computers 13 may not be completely separate links, but may overlap with each other or share some communication pathways, such as where all of the links 15 are Internet communications. Similarly, a number of visualization systems 5 may be tied in to the same local area network and communicate with user systems 13 on the network.

The individual visualization computer systems 5 each receives scene data from the geometry system 3 and produces an electronic image therefrom. The image represents a view of at least a portion of the scene defined by the scene data, prepared pursuant to data defining a point of view that corresponds to the specific user, and viewing parameter data for rendering the scene. The electronic image is preferably pixel data, but may be any other viewable image format, including analog images, such as cable TV signals, layered depth images, or any 2D or 3D image format.

Figure 2A:
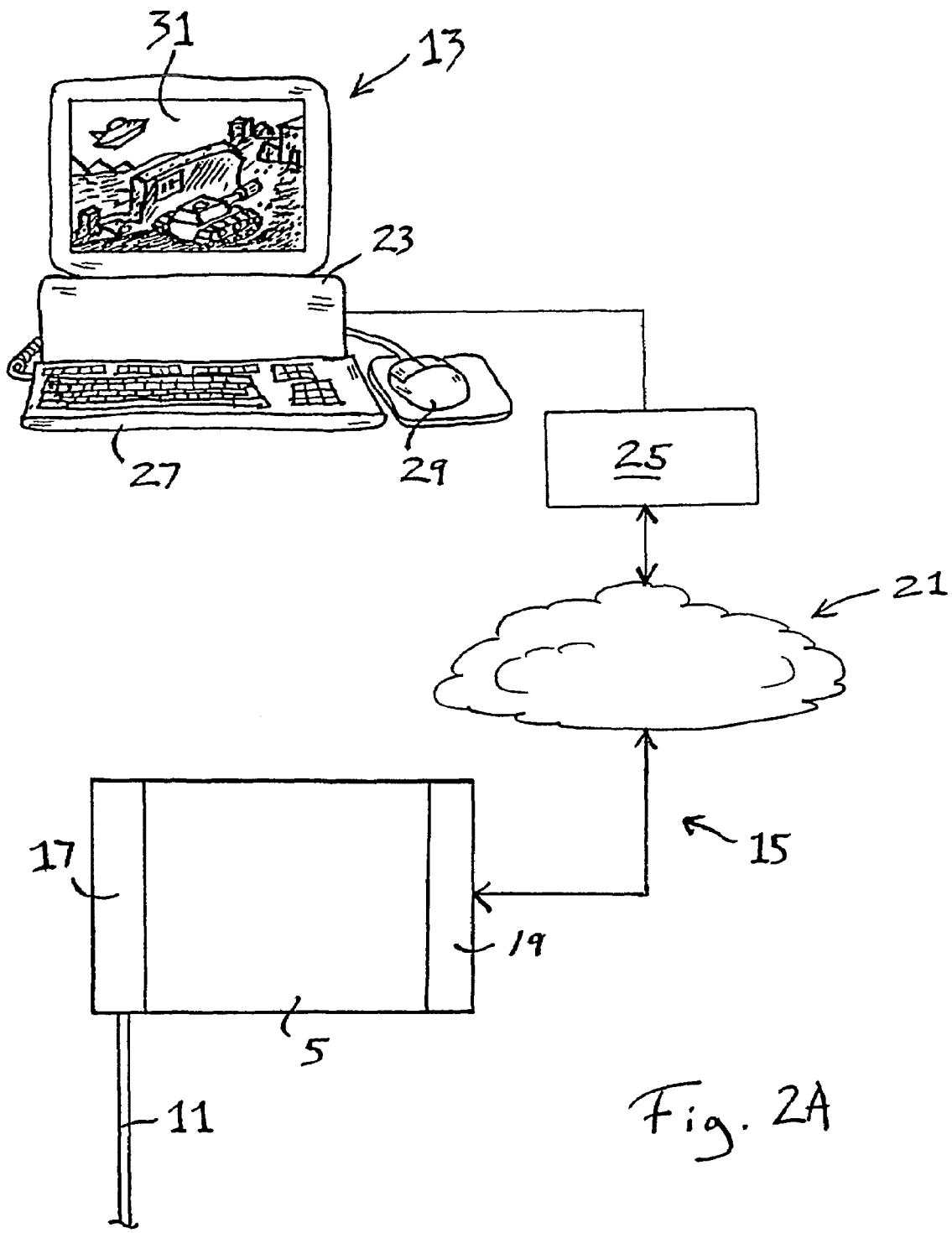
FIG. 2A is a detailed schematic showing one of the visualization systems and its link to a user computer.

The image which is produced by the visualization system 5 is transmitted over the data link 15 to the associated user computer 13. As best shown in FIG. 2A, the visualization system 5 includes a communications connection or other hardware data linkage 17 communicating via high-speed data link 11 to one of the geometry computers 7 of the geometry system 3. Visualization system 5 also functions as a server, having communication connection 19 which links the visualization system 5 to a computer data network, generally indicated at 21. The data network preferably is the Internet, a wireless network, (e.g., cellular), or a broadband network, e.g., a cable network or DSL, but may also be a local area network ("LAN") or other type of computer data transmission network.

Each user computer 13 comprises the computer components familiar in the art, such as a computer CPU 23 and input devices for introducing instructions into the computer CPU, such as keyboard 27 and mouse 29. A display 31 is connected with the computer CPU 23 and displays images transmitted thereto in a form which is viewable by the human user thereof. The computer 13 may also be provided with a microphone input and/or an audio output system.

The user computer 13 also includes a communication connection 25 which is connected with the data network 21 for communicating with the associated visualization system 5. The nature of the network and the connection is preferably such that streaming serial images, e.g., VHS- or HDTV-quality video, can be transmitted to the user computer 13.

To decrease latency in the network link between the user and the visualization computer, the visualization computer 5 is desirably located as close as feasible in network proximity to the user computer 13. Although the system may advantageously be used with much larger network separation, a connection of less than 2 or 3 network hops is preferred for a real-time interactive system with streaming images. Ideally, however, one or no network hops are present between the user computer 13 and the visualization computer 5. Such a system would exist where the visualization computer 5 is located at the Internet Service Provider (ISP) for the user computer. The user there communicates with the ISP server and visualization computer over a very short link of a data network, such as local telephone line or a cable TV line, linking the user computer 13 with a visualization computer physically in or adjacent to, and wired to, the ISP server.

As one example of such a system, the user computer 13 comprises a very simple computer system that has the limited function of processing input from a joystick control thereon and transmitting instruction data derived therefrom over cable TV wiring to a server.

The server contains or is wired directly to a visualization computer which renders images from the joystick input data and from scene data, and then returns rendered images as real-time cable TV video over the cable TV line.

According to the preferred embodiment of the invention, the computer is equipped with a software package which allows the user to send control data to create or edit the scene without the need to transmit scene data itself. In other words, the user computer software receives input from one of the input devices thereon, and interprets the input as instructions or data configured to interface with software or hardware of the visualization computer. This interface results in a change in the scene data. The user computer 13 transmits control data, the interfacing data or instructions, to the image generating system via data communication connection 25 with the link 15. This control data is configured to influence the ultimate rendered image, and comprises data that is used to control or influence either the scene data itself or the viewing parameter data used by the image generating system to render the image. Although it is less desirable from the standpoint of reducing data traffic load and the size of the application running on the user computer, the control data may include partial scene data to be incorporated into the scene data on the visualization computer. The control data may also be one or more instructions to a software application operating on the visualization computer 5.

Where the control data is instructions to a software application running on the visualization system, the instructions may cause any of a variety of changes to the scene data, to the point-of-view data, or to the viewing parameters data. For example, the instruction may be a direct edit command for a visual object in the scene, such as to change its color, size, orientation or position. The instruction may similarly direct the visualization computer software to make a change in the point of view or the viewing parameter data. The instruction also can be a higher level instruction to a specialized application, such as to game software running on the visualization system, which would cause a substantive change in the scene, such as, for example, opening a door, pushing a rock off a cliff, or any other imaginable action in the virtual scene. The instruction can also have a combined effect on the scene and viewing data, as, for example, where the instruction is to change the point of view, and this results in the movement of an avatar of the user in the scene which can be seen by the user himself or another user.

Because the user needs only the limited software package to communicate with the image system, there is no need for the user to acquire or download a large software package or to obtain special hardware such as graphics cards to perform the tasks performed by the image generating system to which the user is linked.

Preferably all users on the system can access a virtual scene in the same area thereof and make non-conflicting changes while the other users observe. Conflicts in user-directed changes are processed by conventional methods of task sharing of data, which are well known in the art. In addition, a lockout function in the geometry system software prevents two users simultaneously changing the same object in the scene.

The scene data and the viewing parameter data are stored in the image generating system both in the visualization systems 7 and the geometric computer systems. However, since each visualization system 7 generates electronic images for only its user(s), the visualization system does not require the scene data in its entirety, but only that portion of the scene data that is relevant to the point of view of the associated user(s). The geometric system 3 therefore preferably transmits only relevant up-to-date scene data to each visualization computer 7 at a high frequency, and ensures that the subsets of scene data that are sent to the visualization computer 7 are the most current versions of those subsets, as the scene data is modified by the action of the many users of the system. Because the voluminous scene data is stored only in the image generating part of the overall system, the user computers need not support the large amount of memory or storage space needed to accommodate complex scene data.

The viewing parameter data defines how the scene is viewed, and includes, at a minimum, data that identifies a point of view of the user which the visualization computer 5 uses in rendering the electronic image. Subsequent changes in the point of view can also be entered by the data input devices, which may be the keyboard 27, the mouse 29, a joystick (not shown), or any of a variety of other input devices well known in the art The viewing parameters may also include parameters that define the optics of a camera, which is simulated in the rendering of the view of the scene. Such parameters can be focal distance, depth of field, distortions due to camera lenses, or other general parameters such as graininess, filtering, etc.

Each visualization computer may support one or more user computers over the associated links 15. Consequently, the computational demands on a given visualization computer may be quite high while another visualization computer linked thereto by data link 15 is idle or less heavily loaded. Accordingly, the visualization systems are provided with load-sharing software that allows visualization systems to share the computational effort of rendering one or more images for a given user. The data processed and the resulting data are transferred between visualization computers by direct or indirect links between the visualization computers, or possibly via the high-speed links 9 of the geometric system 3. Algorithms for this type of load sharing are known in the prior art, and generally rely on running assessments of individual computer computational load with protocols for balancing the computation.

Similar load balancing of computation is also provided among the various geometry computer systems 7 to efficiently distribute computations involving the scene data. Since the geometry computers 7 are fully connected, directly or indirectly, to all other geometry computers by links 9, computational load can be readily distributed and balanced throughout geometry control system 3.

Streaming video images may be generated together with streaming audio. The audio portion of such a signal is generated by a sound engine hardware or software on the visualization computer. The resulting sound is produced based on the scene data, and possibly other sound recording files and is made audible over an audio system of the computer. The sound engine preferably provides a realistic acoustic effect, such as reverberation, echoes, etc., based on the scene data.

Similarly, the user computer may be fitted with tactile output devices that simulate the feel of an object in the scene. Devices of this type are currently available on the market, and these devices can simulate a variety of textures, such as sandpaper or ice.

Figure 2B:
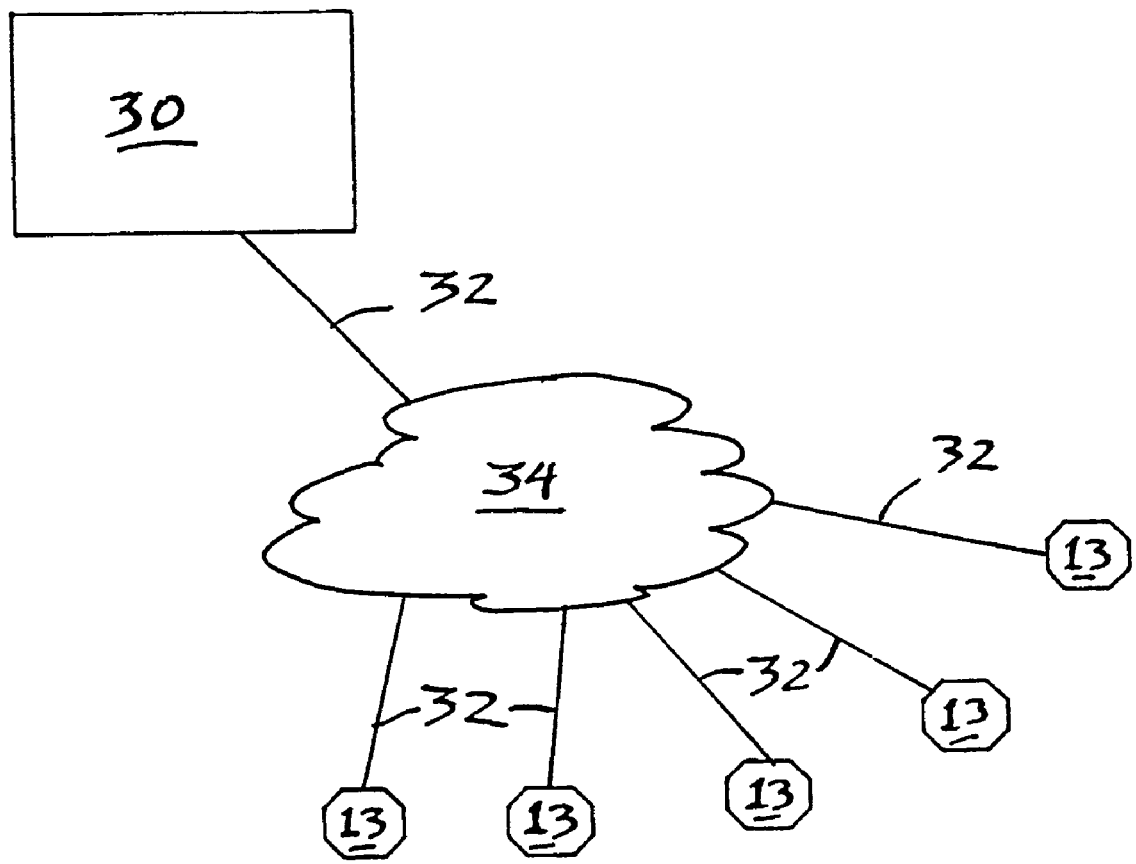
FIG. 2B is a schematic showing an alternate embodiment of an image generating system in which single-frame rendering is provided at slower turnaround times.

In an alternate embodiment, shown in FIG. 2B, the image generating system may provide rendered images to user computers 13 as a single frame at a time, with a turnaround time which is slower than a real-time interactive system. The user computers 13 are similar to those of the preferred embodiment, although slower communication software and hardware may be used therewith. If a change to the scene is made by any of the user computers 13, the control data reflecting these changes is transmitted to the image generating system 30 over links 32 via a computer data network 34. The image generating system 30 automatically returns the rendered electronic image to the user computer 13 automatically responsive to the control data.

In such a system, a turnaround time for returning an image can be as much as 5 to 10 seconds, so the latency issue addressed in the real-time interactive system above with its geographical distribution does not arise. Consequently, the image generating system 30 of the alternate embodiment preferably combines both the geometric and visualization systems 3 and 7 in a single location and can be located at any distance from the users, preferably on a server computer system connected directly to the data network, which is preferably the Internet. Many users can access the visualization system, and their tasks are simply run in a queue.

The method by which any of the image generating systems renders an electronic image can be virtually any rendering system compatible with the turnaround time needed for the given application. For example, the visualization system can use graphics pipeline circuitry, such as Open GL cards, to create the image and then transmit the image to the user.

Particularly preferred, however, is the improved rendering system disclosed herein, which provides especially fast rendering, particularly beneficial in a real-time interactive system.

b. Organization of the Scene Data

One of the features of the present system that is preferably used to enhance the speed of rendering is the organization of the scene data in a database stored in a computer data storage device or memory that allows rapid identification of the visual objects that are contacted by a ray or beam tracing through the scene space.

The scene data defines the light sources and objects in the three-dimensional scene. Light sources are defined as either parallel-ray directional lighting (such as sunlight or moonlight), point lighting, or as area light sources, which are two- or three-dimensional surfaces defined by one or more triangles or quadrilaterals. The objects in the scene are defined as visual objects meaning anything that reflects or alters light that contacts it, including transparent objects.

Visual objects may be defined by any protocol known in the art. Visual objects are generally triangles (also referred to as primitives), tesselated surfaces (i.e., assemblies of triangles), or higher order objects, e.g., spheres, ellipsoids, or more geometrically complex sheets, such as NURBS surfaces or patches, which are non-planar surfaces defined by a function or a combination of functions. The triangular primitives are identified by the coordinates of their three vertex points. Higher complexity objects are defined by the function that describes them, together with whatever point or points are appropriate. Also, where a visual object is a complex surface, the definition of the object also includes a normal vector to the surface of the object, defined either numerically or as a function.

Each visual object also has a set of additional parameters which further define its visual characteristics, e.g., a color, a transparency coefficient, a specular coefficient, a texture definition, and a reflectance identifier. The visual object may also be a layered object having a plurality of these parameters each representing a layer thereof.

The color of the object is preferably defined according to a common computer color definition in which three numbers represent, respectively, the red, green, and blue intensities of the color. The transparency coefficient defines how much light can pass through the object. This transparency coefficient ranges from 0 to 1, with 0 corresponding to complete transparency, and 1 corresponding to total opacity. The specular coefficient is also a number from 0 to 1 which defines the specular quality of the visual object, i.e., how mirror-like the surface is, with 0 indicating a completely diffuse surface and 1 indicating a mirror surface.

The texture is preferably defined by a code or tag pointing to a stored bitmap or image that can be mapped onto the object to give it an appearance of concrete, marble, sand, etc. The textures may be one-, two- or three-dimensional arrays. Alternatively, the texture may be defined as procedural texturing, wherein a formula or algorithm is identified or defined which, when calculated or performed, generates the desired texture for the object.

The reflectance identifier is a code or tag that specifies which bi-directional reflectance distribution function ("BRDF") should be used for the surface of the object. The specific BRDF defines how the surface of the visual object scatters light as a function of the angle of the incoming light and the angle of viewing. The BRDF will be discussed in greater detail below with regard to rendering.

The scene data may be created in a variety of ways. For one, it may be created by a user through one of the user computer systems, in which case, the user computer and/or the visualization computer is equipped with a communication software package which enables the user to generate and edit visual objects in the scene data stored in the image system. A number of appropriate interactive programs exist on the market which offer this function, including 3D Studio Max from AutoDesk, Inc. Alternatively, the scene data can be created by an application developer on one of the visualization computers, on one of the geometry computers, or on a separate system and downloaded into the geometry control system.

The defined visual objects may be downloaded from the user computer to be placed in the scene, or they may be transmitted in more compact format. A particularly effective reduction in the size of the transferred visual objects during creation or editing thereof is obtained by defining the texture of an object procedurally, i.e., defined as a function as opposed to a bit map. When the user defines a texture by a function, this function is transmitted to the image generating system instead of transmitting the bit map for the texture. The data defining a function for a texture such as marble or wood grain is generally small in comparison with the data for a color bit map of the actual texture. The transmission of the selected texture of an object by its functional definition therefore represents a substantial reduction in the amount of data that must be transferred from the user computer to the image system.

During or after creation of a scene by defining the various scene elements, it is advantageous according to the present invention to organize these scene elements in data storage so as to make it easier to render an image from the scene data. This is accomplished using a database having a data structure that organizes the scene for more efficient storage and transmission, and, more importantly, for more efficient calculation of relevant scene elements to reduce the computation time needed for rendering the scene.

Figure 3:
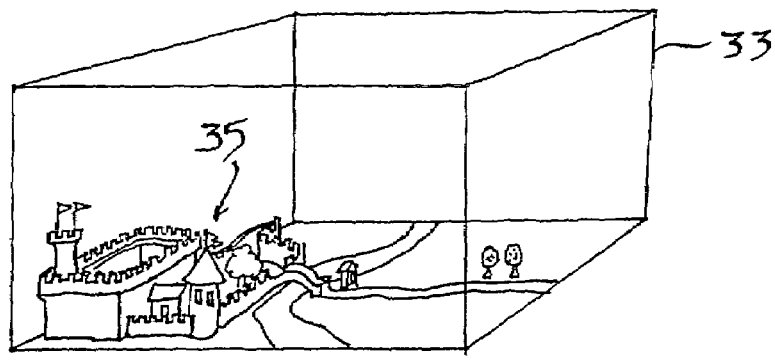
FIG. 3 is a perspective view diagram showing a three-dimensional virtual scene with visual objects therein.
Figure 4:
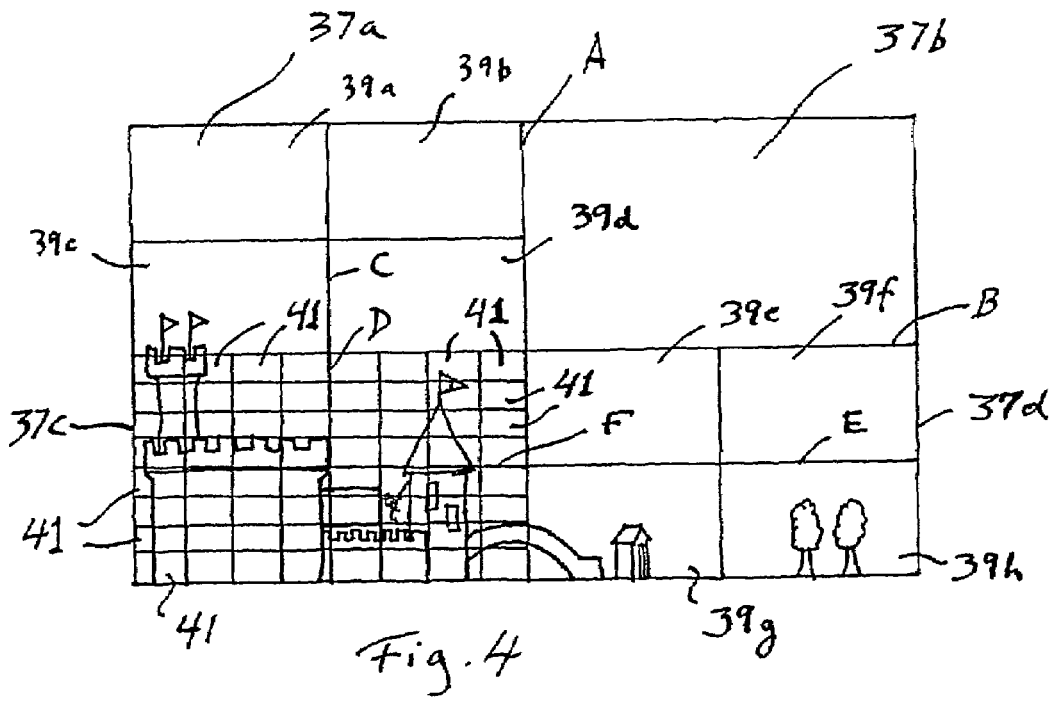
FIG. 4 is a front elevational view of the scene of FIG. 3, to which multiple uniform subdivision partitioning has been applied.

The pre-rendering organizing process is illustrated by an example shown in FIGS. 3 and 4. In FIG. 3, a very simple scene is shown, comprising a set of visible articles 35 composed of visual objects and distributed in the scene space 33. FIG. 4 shows the same scene in a front elevational view.

To organize the scene data for the scene database, the entire scene volume, sometimes referred to as "the world" or the "the universe", is initially partitioned into a grid of cells, which are preferably cubic or rectangular boxes with sides at right angles to each other. These cells are preferably identified by a Cartesian-type coordinate system, with each cell identified by three non-negative integer coordinates. The world space can be divided into as many grid cells as are desired.

For simplicity's sake, in the example of FIG. 3, the world or scene 33 is partitioned by midpoint bisecting cuts A and B into eight equal subdivisions or cells or boxes, four of which, 37*a*, 37*b*, 37*c*, and 37*d*, are seen in FIG. 4. It will be understood that another bisecting cut is made to partition the front half of the scene 39 from the back, although that cut and the four rearward cells are not visible in the view of FIG. 4.

After the scene is divided into the grid of cells, each of the cells is then analyzed by counting the number of visual objects that are found in it. If the cell is empty, or if it contains fewer than a subdivision threshold number of visual objects, usually a number between 10 and 100, no further analysis or subdivision is performed on that cell. If, however, the cell has more than the subdivision threshold number of visual objects therein, it is subdivided further by division into two along each dimension. Alternatively, subdivision into a number of cells greater than 2 in each dimension, i.e., a subdivision number of 3 or more, may also be used, instead of subdivisions by 2's. Subdivision in 2's is preferred, however, because it gives a computational advantage in a binary digital computer, where multiplication and division by 2 is a bit-shift operation.

Furthermore, where the individual box contains a large number of visual objects, e.g., more than 10,000, and these are distributed through the box, it is most probable that this box will be subdivided several more times before the count of visual objects in each sub-box is less than the threshold. Recording the repeated subdivision of the boxes is a waste of memory, and also makes processing of the scene data inefficient. Accordingly, when a cell contains a number of visual objects that is larger than a multiple subdivision threshold number, that cell is subdivided not by the subdivision number (i.e., 2) of partition in each dimension, but by an integer power of the subdivision number, here 2.

This process is illustrated in FIG. 4. The space 33 is subdivided once into cells or boxes 37*a*, 37*b*, 37*c*, and 37*d*, and four boxes behind them that cannot be seen. Box 37*b* contains no geometry, so it is not subdivided any further. Boxes 37*a* and 37*d* contain some geometry; they are subdivided by two partitions in each dimension. Assuming for the sake of example that each of the sub-boxes 39*a* to 39*h* has fewer than the subdivision threshold number of visual objects, they are not subdivided further.

Sub-box 37c, however, contains a large number of visual objects which exceeds the multiple subdivision threshold, and these are distributed throughout the box 37c. This sub-box 37c is therefore subdivided in eight (8) sub-cells in each dimension, yielding $8^3$ (i.e., 512) sub-cells 41. Assuming, again, for the sake of the example, each of these sub-cells 41 contains fewer than the subdivision threshold number of visual objects, these cells 41 are not further subdivided. However, if the number of objects in any cell 41 exceeds the subdivision threshold number, subdivision of that cell 41 is repeated until no sub-cell therein contains more than the subdivision threshold number of objects.

The number of multiple subdivisions taken may be any number which is an integer power of the usual subdivision number. In the preferred embodiment, the subdivision number is 2, so the multiple subdivisions are $2^M$ in each dimension, yielding $2^{3M}$ subcells. The number M of multiple subdivision levels preferably depends on the number of visual objects in the box being subdivided. Preferably, the multiple subdivision number M is calculated as directly proportional to the quantity:

$$\lceil \log_q(N/T) \rceil$$

where N is the number of objects in the cell, T is the single subdivision threshold (the minimum number of objects in a cell to trigger a single subdivision), and $q=s^3$, where s is the usual subdivision number which in the preferred embodiment is 2.

Where a large number of objects are present, if the objects are bunched in a small region of the box, only single subdivision, not multiple subdivision, is used.

This type of scene data structure is referred to as a multiresolution virtual uniform subdivision (MVUS) data structure. The virtual subdivisions are called uniform because, due to the multiple subdivision number being an integral power of the subdivision number, the planes of subdivision of coarser levels of resolution always line up with a plane of subdivision of those cells that are divided in a finer grid. This can be seen in FIG. 4, where partition plane C in box 39c aligns with partition plane D in multiply subdivided box 37c. Similarly, plane E in box 37d aligns with partition plane F. The spatial result of this is that each face of each box faces an integral number of adjacent box faces, which is advantageous for tracing rays or beams therein, as will become herein apparent.

Figure 5:
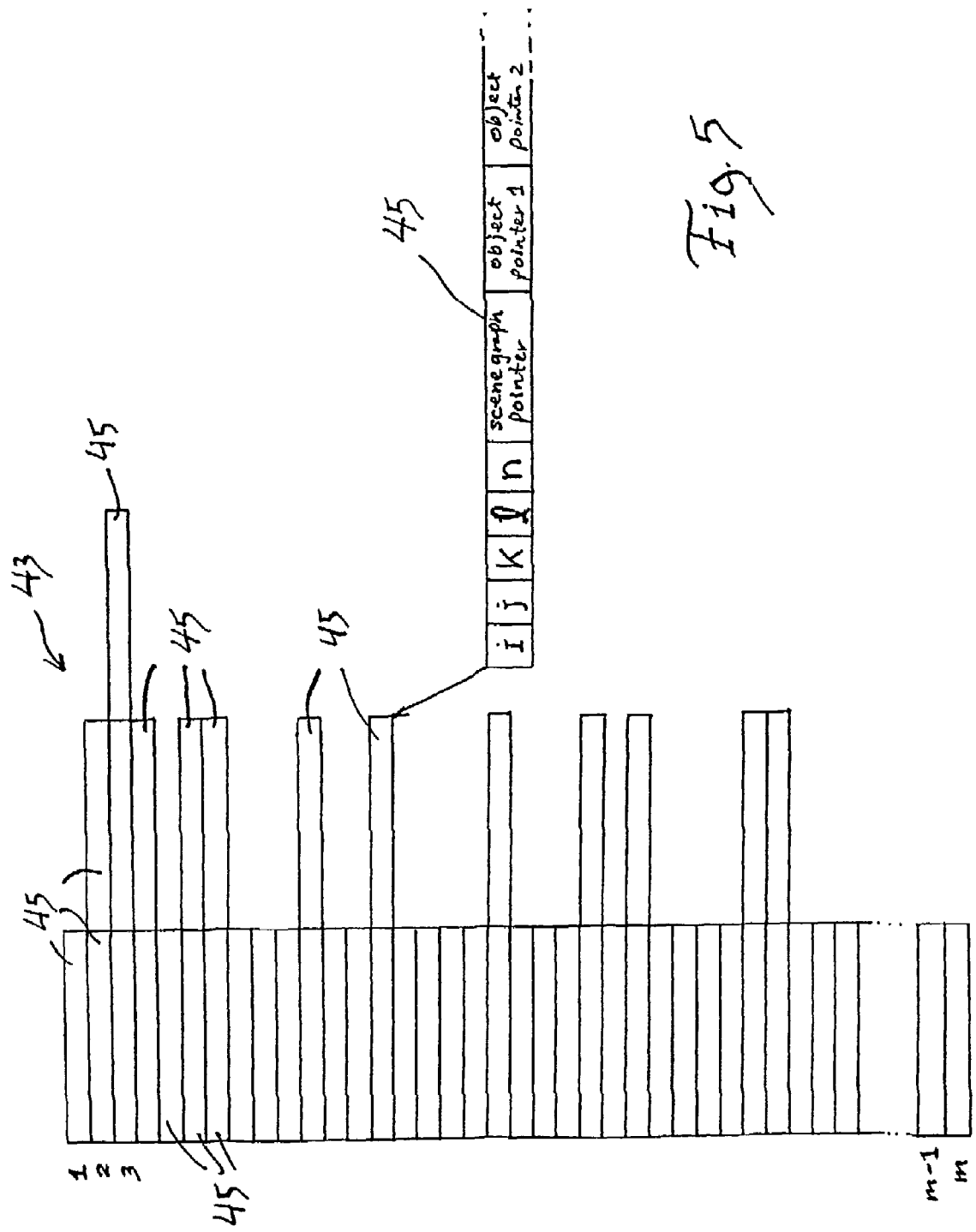
FIG. 5 is a diagram of a hash table used to store scene data.

As best shown in FIG. 5, for efficient storage, the scene data that has been organized in an MVUS structure is loaded into a hash table 43. The hash table has m positions, each of which may have one or more records 45 therein, or no record. Only those boxes or cells that contain geometry are stored in the hash table 43, so if a cell is not found in the hash table 43, that cell is empty.

The individual record 45 contains a number of packets of information. At the very least, the record of a cell that has geometry in it contains coordinate fields i, j, and k which identify the box by its location in a Cartesian coordinate system of the MVUS structure. The field l contains a number identifying the level of subdivision of the cell. For example, in FIG. 4, for box 37b, l=0. For boxes 39a to 39h, l=1. For boxes 41, l=3.

Data field n stands for the number of further subdivisions of the particular cell. Where n is zero, this means that the box is not subdivided further. Where n is 1, as it is for boxes 37a and 37d of FIG. 3, there is one further level of subdivision. For box 37c, n is 3.

Figures 6, 7, 8:
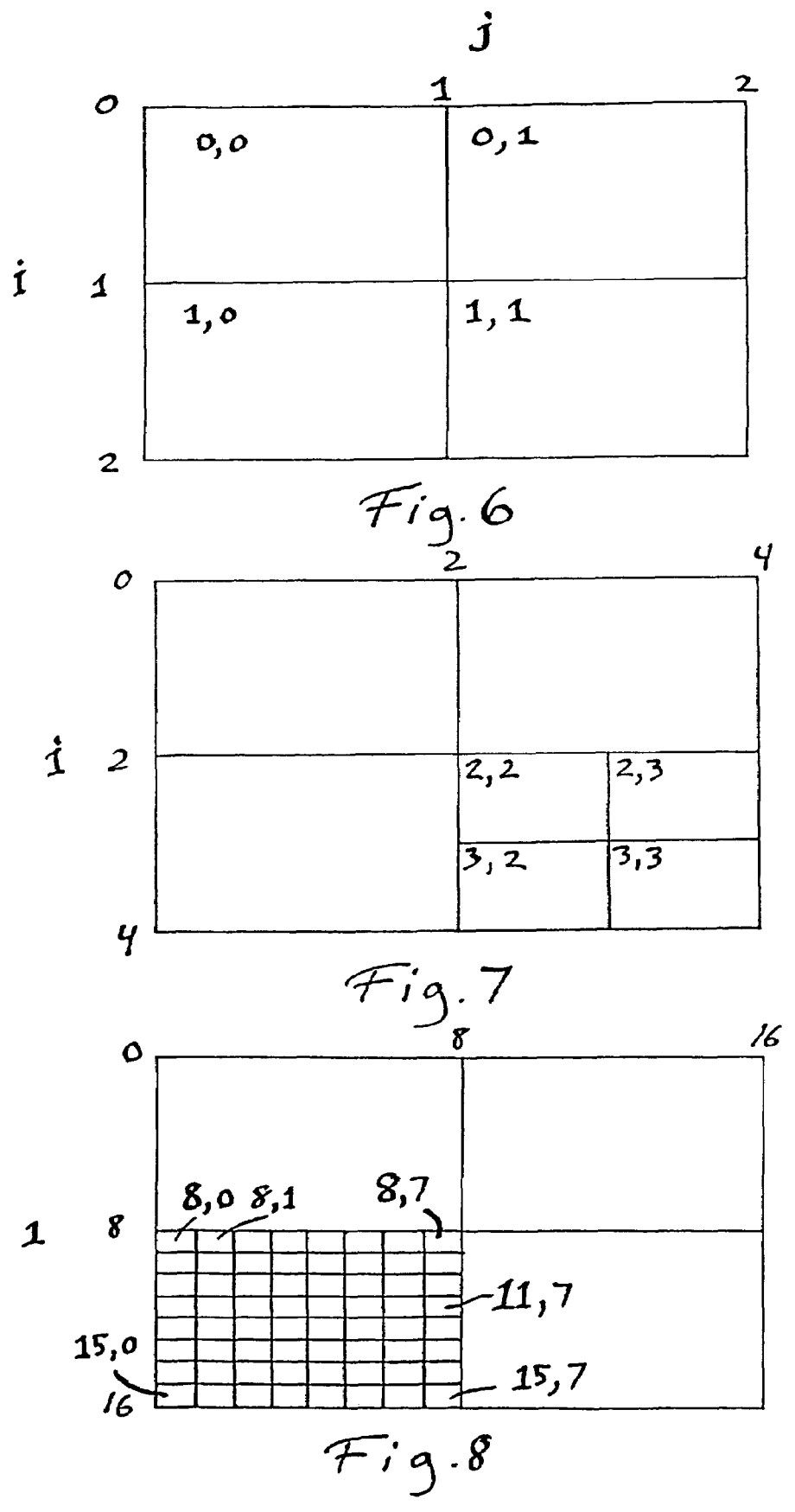

The Cartesian coordinate system for the MVUS sub-cells is best illustrated in a two-dimensional scheme in FIGS. 6 to 8. Those of ordinary skill in the art will be able easily to appreciate the extension of the simplified 2-D example to a 3-D space.

Each box is identified by the coordinates of the corners of the box which are lowest in value. At each level of subdivision, the coordinates are multiplied by the subdivision. Thus, in FIG. 6, the four level-zero cells are identified by indices i and j as (0,0), (0,1), (1,0) and (1,1). It will be understood that for a more complex scene, the level-zero grid usually contains a much larger number of grid cells, and the set of coordinate values will be from (0,0,0) to the number of cells in each dimension, e.g., (1000, 800, 100).

At a single further level of subdivision, as best seen in FIG. 7, the coordinate scale of the lower-resolution level is multiplied by 2 to yield the coordinates of the smaller higher-resolution sub-cells so created. This multiplication by 2 is particularly efficient in a digital system because, in binary, this is accomplished by a simple bit shift to the left one place. In the example shown, the coordinates of the level 1 boxes are (2,2), (2,3), (3,2) and (3,3). For multiply-subdivided boxes at level 3, as seen in FIG. 8, the coordinates are multiplied by $2^4=16$. The indices of the level 3 boxes range from (8,0) to (15,7).

The location of the stored data record in the hash table for a given box identified by its three spatial coordinates i, j, k, and by its level number l is determined by the formula:

$$\text{hash address}=(c_i i+c_j j+c_k k+c_l l) \bmod_m$$

where $$C_i \approx \frac{C_j}{10} \approx \frac{C_k}{100} \approx \frac{C_l}{1000} \approx \frac{m}{10,000}$$

The resulting hash table allows for ready access to the scene data in a given cell.

Figure 9:
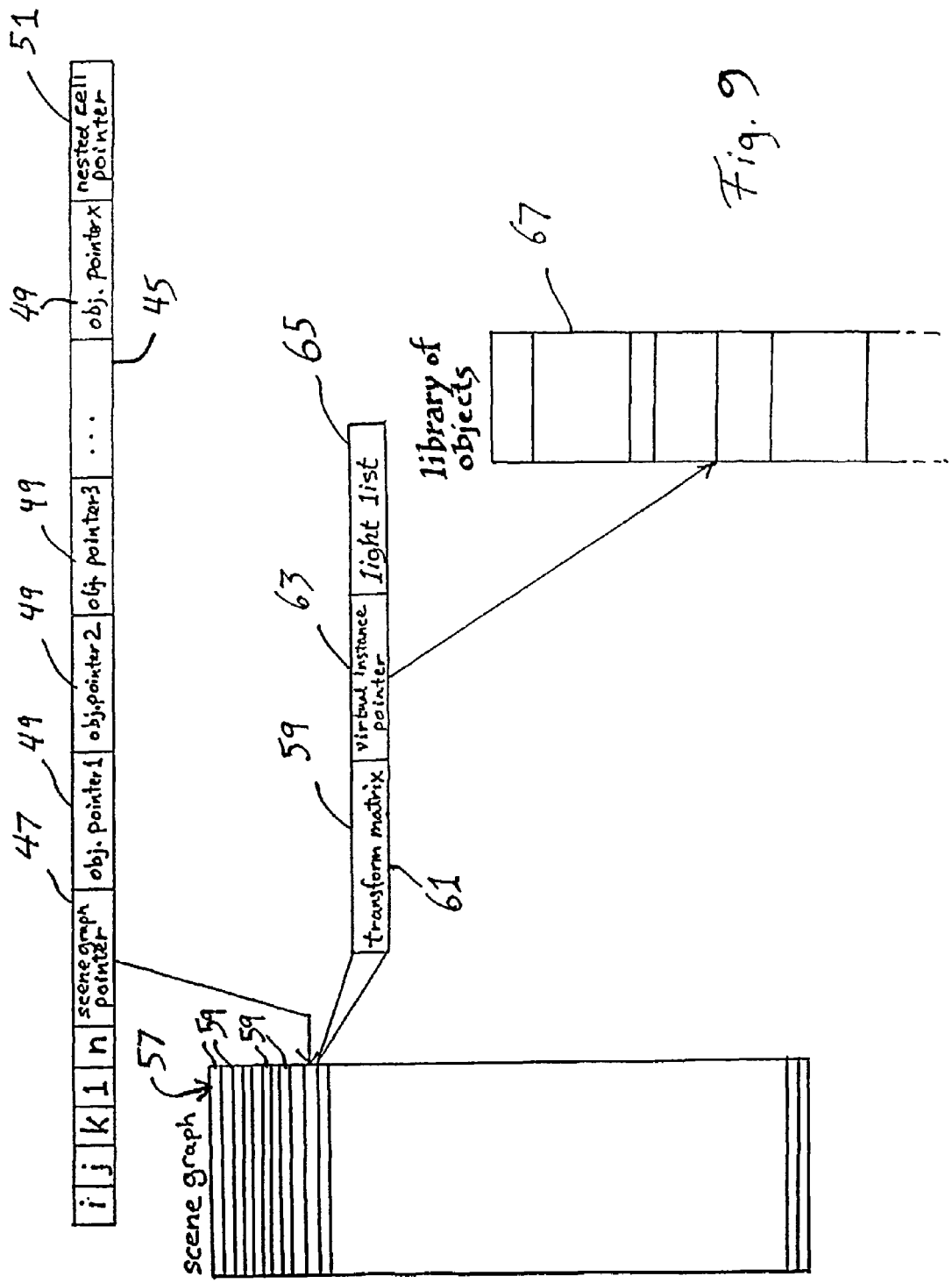
FIG. 9 is a diagram of the use of the hash table entry for accessing a record of a complex visual object which is repeated in various scenes.
Figure 10:
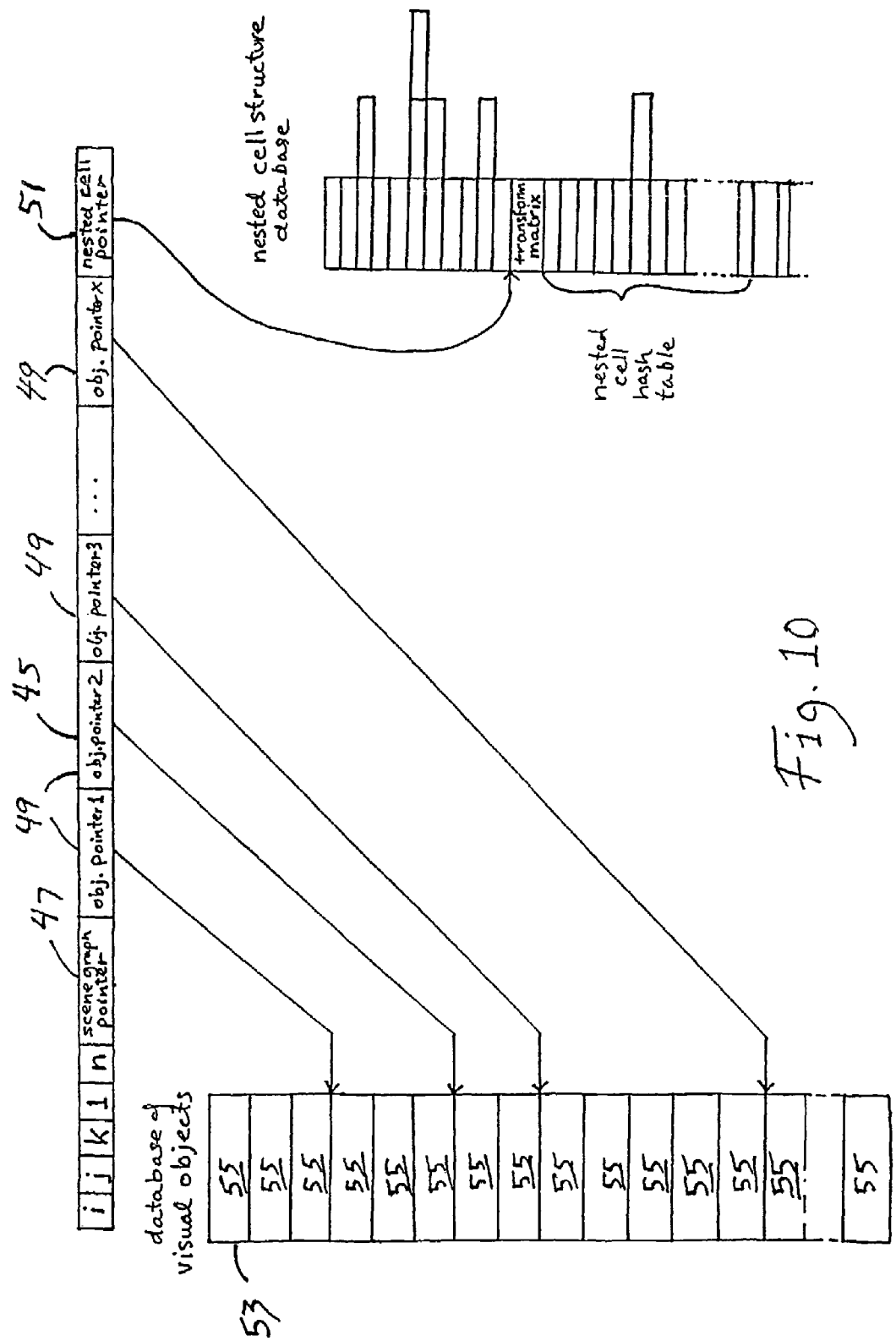
FIG. 10 is a diagram of the use of the hash table entry to identify the visual objects in a cell.

The scene data is obtained using the data as shown in FIGS. 9 and 10. The hash table record 45 of an undivided cell, i.e., an end node of the MVUS subdivision, comprises the i, j, k, 1, and n fields, as discussed above, with n being zero. After the n data field, the record contains data identifying the visual objects in the cell.

In the simplest type of scene data arrangement, the data identifying the objects is a pointer identifying a location in a separate stored database which is a list of visual objects organized by cell. In the preferred embodiment, however, several ways of defining the contents of a cell are available, including pointers to objects in a visual object list, but also data identifying oriented nested objects formed of many visual objects.

Accordingly, in the preferred embodiment, the hash table record 45 includes a scene graph pointer field 47, a series of object pointer fields 49, and a nested MVUS pointer field 51.

Object pointer fields 49 each contain a pointer to a location in a separate visual object database 53 of visual objects in the scene. The location in the visual object database 53 holds a record 55 defining a visual object which is defined as has been mentioned previously.

The scene graph pointer field 47 contains a pointer that identifies a node of a scene graph data structure 57 (see FIG. 9) of a stored database of visual objects. The scene graph 57 has a number of nodes 59 each of which holds a record. The node record 59 includes transform matrix data 61 and a virtual instance pointer field 63. The term "virtual instance"

refers to an occurrence in the scene of an object which is a fairly complicated assembly of visual objects that occur repeatedly in a scene, such as, for example, a seat in a stadium. Rather than store many copies of the data defining the visual objects that make up the repeated object, a single copy of the data defining the object is stored in a library of objects 67, and this is used whenever there is a virtual instance of the object. The transform matrix is used to transform the coordinates of the object as defined in the library into the actual coordinates of the particular virtual occurrence in the cell.

The light list 65 identifies the light sources in the database of visual objects 53 that are relevant, i.e., that shine light onto objects in the cell. The light list also identifies any parallel beam light in the scene by the vector of its direction of propagation.

Figure 11:
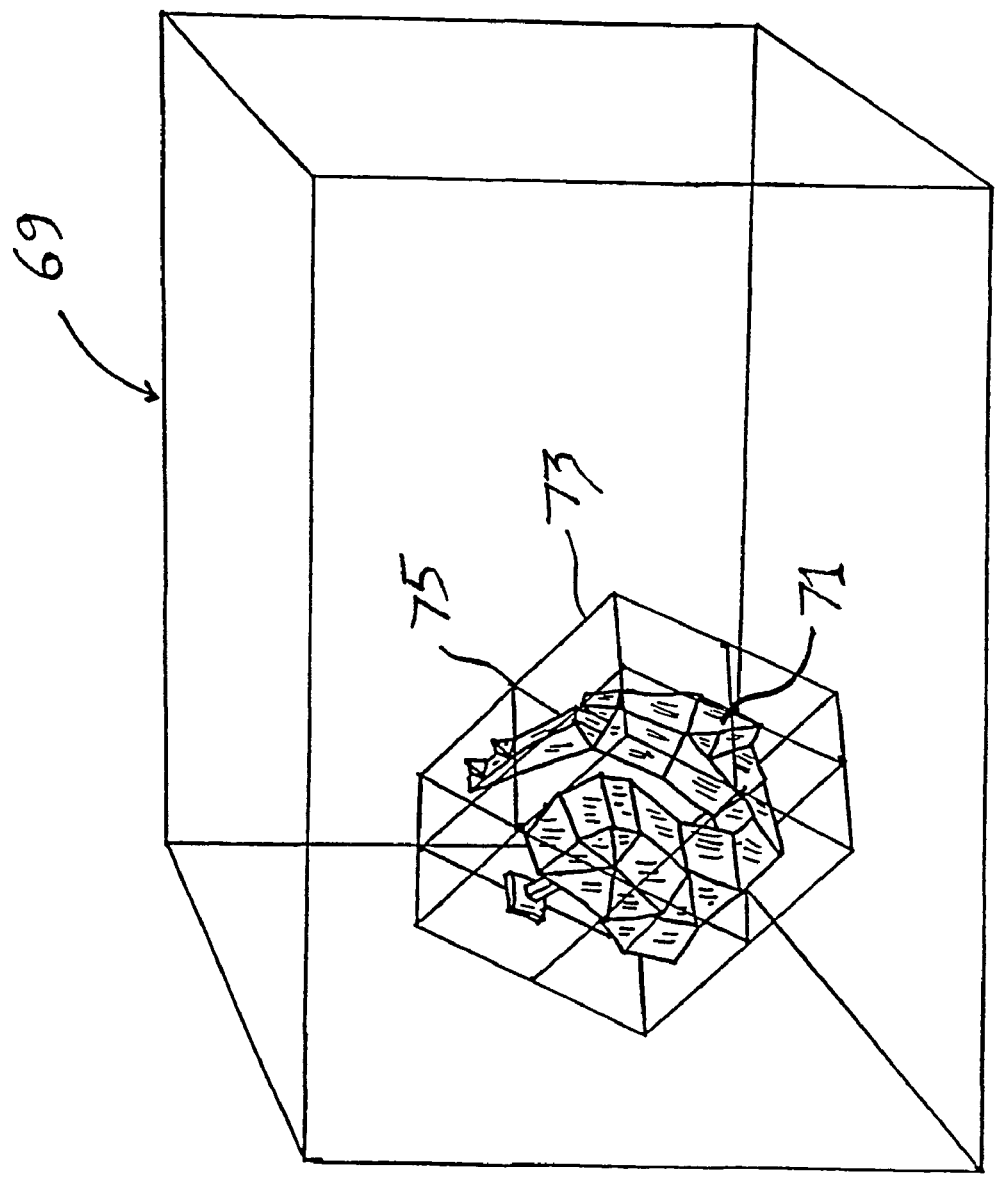
FIG. 11 is a diagram of a rotated nested sub-cell in a larger MVUS grid.

The nested cell pointer field of the hash table record contains a pointer to the beginning of a segment of a nested cell structure database. A nested cell is used when a complex object comprising a substantial number of visual objects occupies only a small portion of the box it is in. In such a situation, illustrated in FIG. 11, most of the cell 69 is empty, except for the object 71. A box or boundary volume 73 is defined by an algorithm that identifies the object 71 and circumscribes the object 71 with a box, which is then rotated and shrunk in to fit closely around the object 71. This boundary volume 73 is then parsed using the MVUS procedure, with subdivision partitions applied as to a larger scene as was discussed above. The nested MVUS hash table is stored coupled with data defining a transform matrix that expresses the orientation of the nested box relative to the larger box and that is used to transform a ray or beam in the larger box into the internal coordinates of the nested boundary volume 73. Once the ray or beam is converted to the coordinate system of the nested MVUS, the nested MVUS itself is traversed exactly as the larger surrounding MVUS, and a nested MVUS may contain further nested MVUS boxes with respective transformation matrices which are processed similarly.

C. Rendering the Electronic Image

In the preferred embodiment, the image generating system creates pixel data which constitutes a view of the scene defined by the scene data, in the MVUS data structure as seen from the point of view of the user as specified by viewing parameters data. The MVUS data structure allows for very fast determinations of ray tracing, and also beam tracing, to identify what visual objects are visible from a given point of view during rendering.

Figure 13:
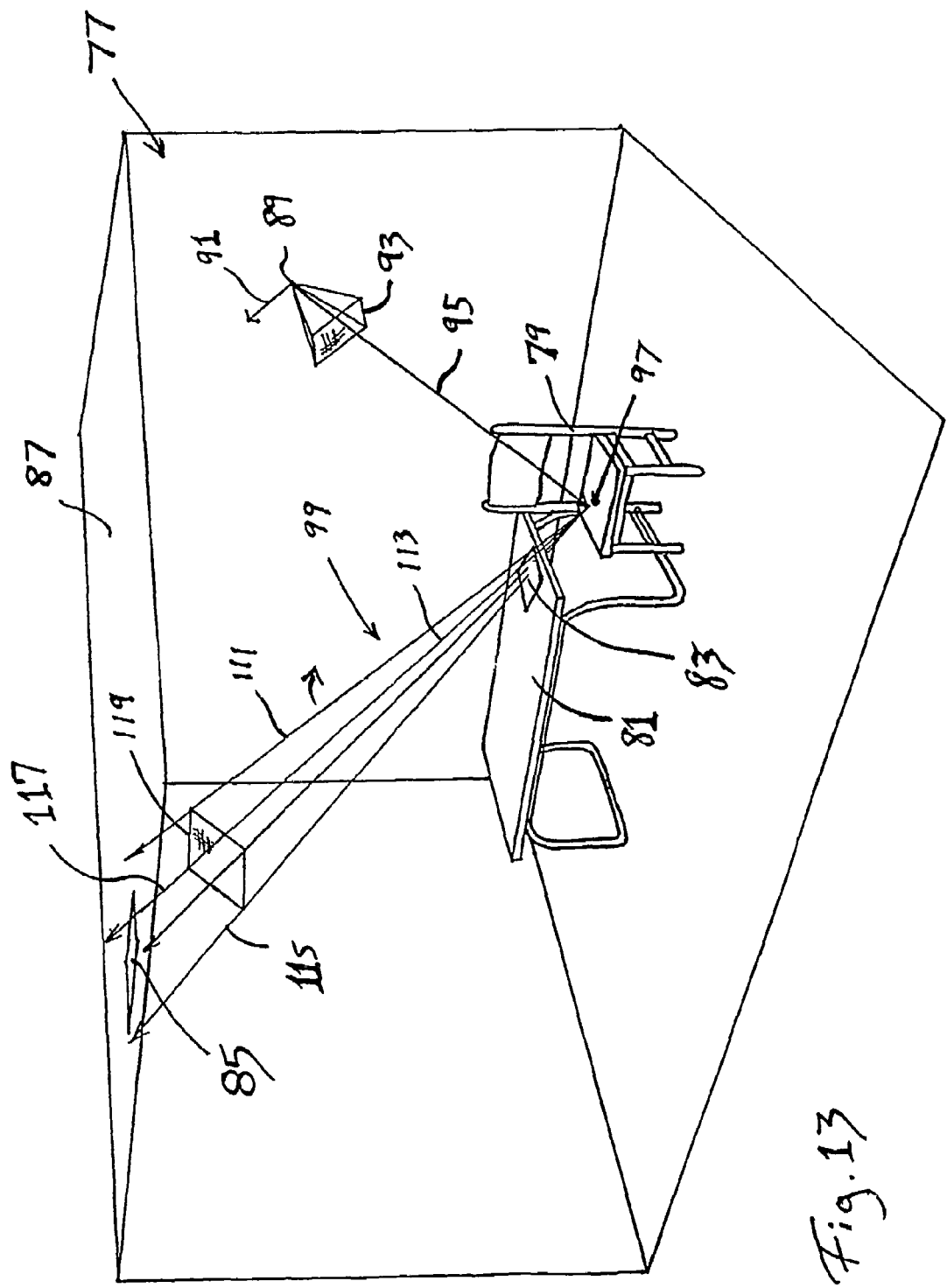
FIG. 13 is a diagram of a virtual scene, illustrating the image rendering process of the invention.

To illustrate the rendering method of the preferred embodiment, a view of a three-dimensional scene to be rendered is shown in FIG. 13. It will be understood that the illustration is only a graphical representation of the computations performed by the rendering system, as the objects of the scene are in reality mathematically defined by electronically stored data.

The scene space 77 encloses a number of opaque and transparent visual objects. An opaque chair 79 is adjacent a transparent glass table 81 on which an opaque magazine 83 is resting. The scene is illuminated by a single rectangular light source 85 in the ceiling 87. The image to be rendered is from point of view 89, with the direction of viewing defined by normal vector 91.

The image for which pixels are to be derived is delineated by a frame 93 which defines therein a grid of pixels of the desired resolution for the image. For each pixel, at least one ray and preferably between 4 and 64 rays are extrapolated from the point of view 89 through the pixel and into the scene space 77. The directions of these rays are governed by the viewing parameters data, and their purpose is to determine which point of which visual object in the scene is seen from the point of view 89 through the specific pixel. Once each ray's contact point is determined, the rendering process determines what color it will appear to have, and then assigns the pixel that color, or, if more than one ray is used, combines the colors of the several rays through the pixel, and assigns the averaged color to the pixel.

Figure 12A:
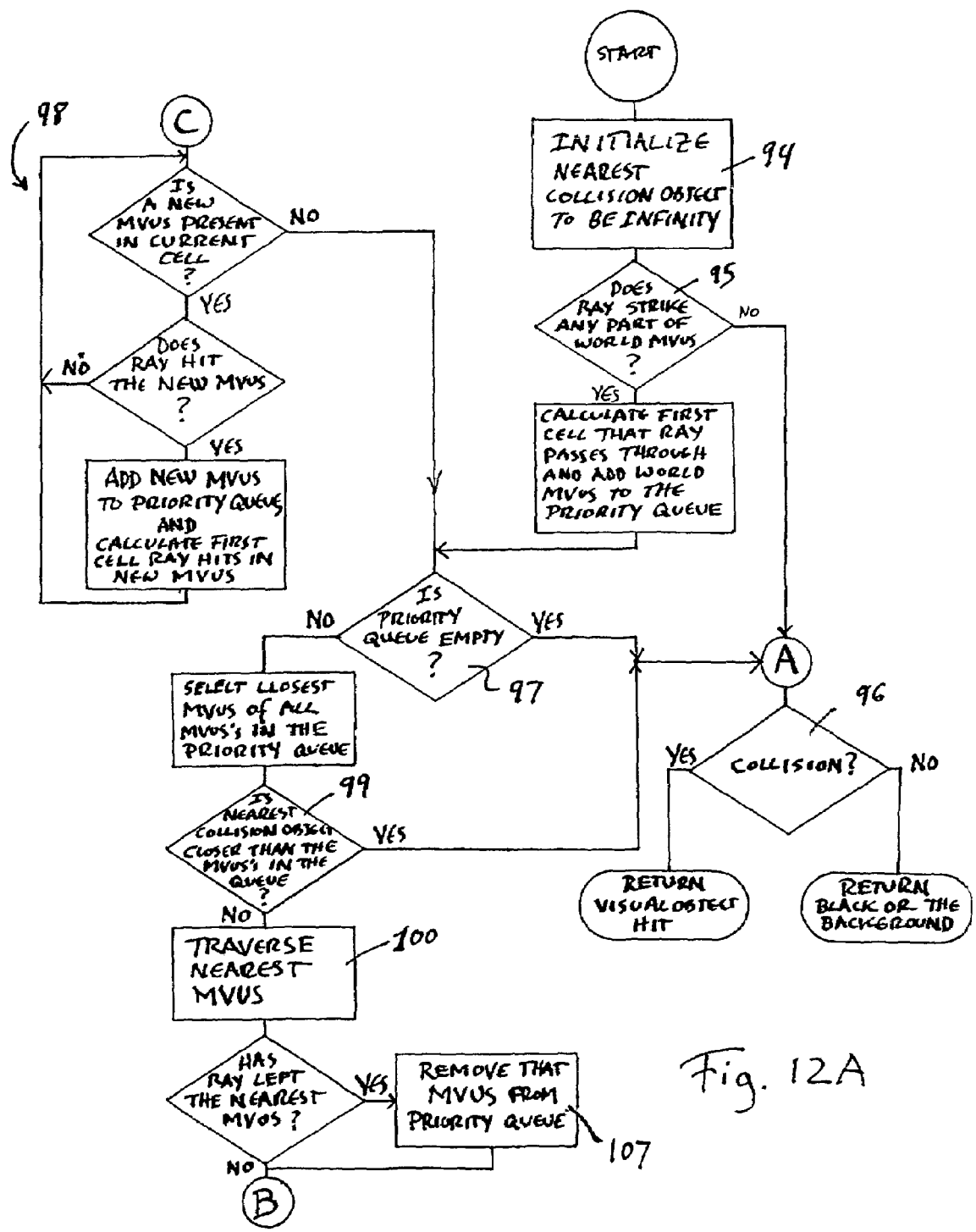
FIG. 12A is a flowchart of the algorithm for tracing a ray through the space defined by a hash table as shown in FIG. 5.
Figure 12B:
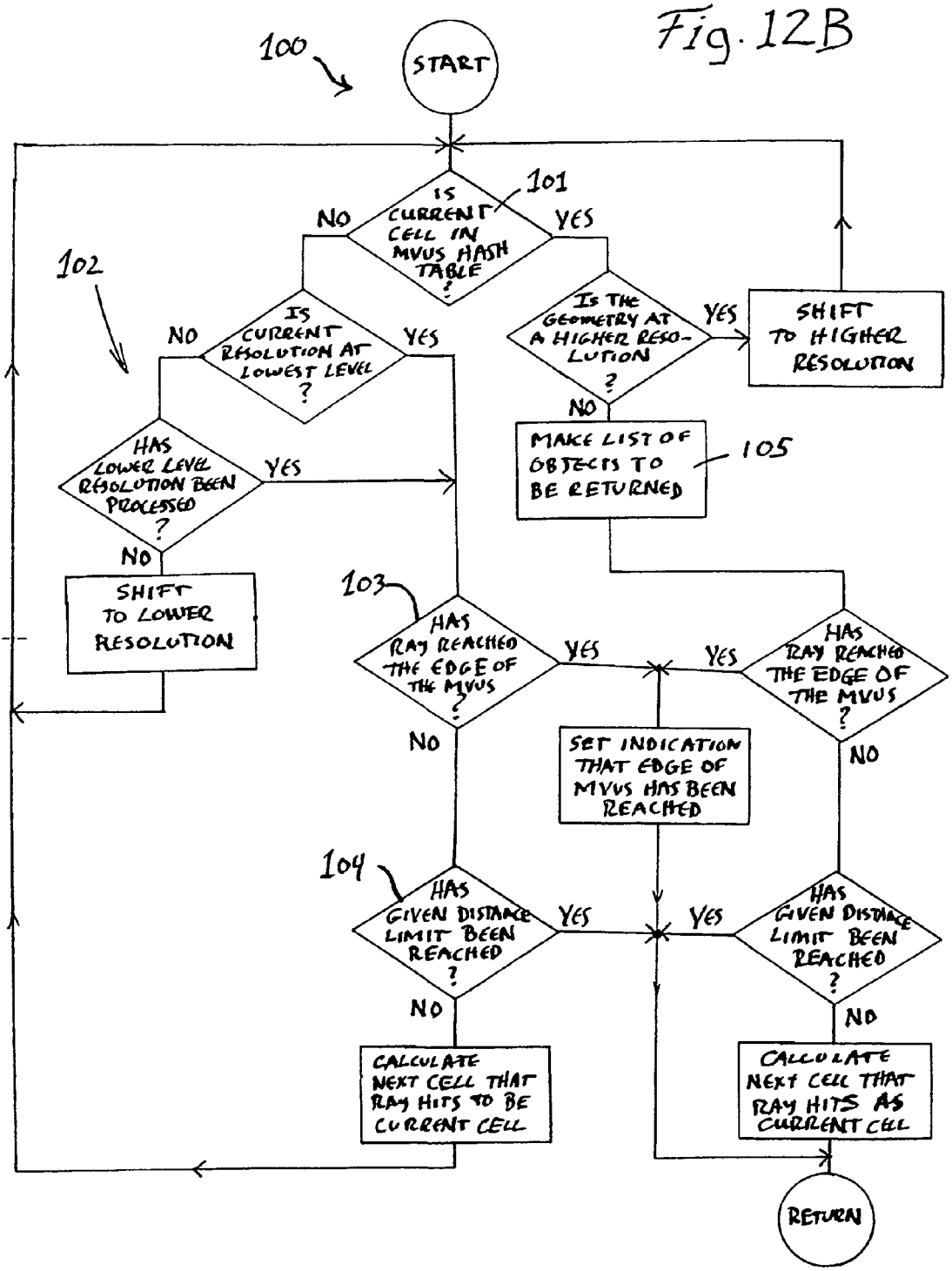
FIG. 12B is a detail flowchart showing the traversal algorithm used in the flowchart of FIG. 12A.

The process of tracing a ray in an MVUS data structure is illustrated in FIGS. 12A and 12B.

The first step 94 in a ray trace is to initialize the data areas used in the trace. The priority queue is emptied, and the nearest contacted object is set to infinity, meaning that any object contacted by the ray will replace it. If the ray does not strike the "world MVUS", i.e., the largest MVUS of the scene (decision 95), the process moves to A (finished). If a collision object has been found at finish, that object is returned as the object struck by the ray. Otherwise, a zero (black) or the MVUS background color is the returned value. The background color value may also be a portion of a bit map of the image of the wall of the MVUS grid which the ray hits, such as a view of mountains in the distance or a flat representation of an adjacent scene.

If the ray does hit the world MVUS, then the first cell of contact is calculated and the world MVUS is listed in the priority queue. Control then passes to the decision block 97 for queue processing.

At the first pass, the queue holds only the world MVUS. In subsequent passes, the queue is loaded by loop iteration 98 with all the MVUS's in the current cell. In either case, the queue is checked for entries. If empty, the process goes to A and the currently identified nearest collision object is returned as the contacted object. If the queue is not empty, the nearest MVUS in the queue is compared with the collision object. If the nearest collision object is nearer (decision 99), the currently identified nearest collision object is returned as the object struck by the ray.

If the MVUS is nearer, it is traversed by a traversal subroutine 100, which is detailed in the flowchart of FIG. 12B.

In the subroutine 100, the first contacted cell is identified, and the i, j, k, and l coordinate values of the contacted box are then used to calculate the hash address for the MVUS hash table. If the hash table does not have an entry for the specified cell (decision 101), and the lower resolution cell is not known (decision 102), then the traversal pulls back to a lower resolution of the MVUS grid, and continues to pull back until a cell in the hash table is found or the lowest resolution of the MVUS is reached (a simple bit-shifting operation where the subdivision number is 2). If the lowest resolution cell is reached, decision 103 checks if the ray has left the MVUS and decision 104 checks if a preset distance limit on the distance of travel for the ray has been reached. If either is the case, the traversal subroutine returns. If neither is the case, the ray is extended to the next cell of the MVUS, and that cell is checked for presence in the hash table (decision 101).

If the current cell is in the hash table, it is checked whether its geometry is at a higher resolution. If so, the process shifts to a higher resolution, i.e., to smaller cells, with the current cell coordinates adjusted by the next level of subdivision of the current cell (again a simple bit-shifting operation where the MVUS subdivision number is 2), and the hash table is checked (101). If the geometry is at the present resolution, the visual objects are put in a list to be returned to the main routine (105). The ray is checked for whether it has reached the end of the MVUS or whether the predetermined maximum distance has been reached. If not, the next cell that the ray contacts is set as the current cell, and the subroutine returns. Otherwise, the subroutine 100 returns with the same cell as current cell.

On return to the main routine, the ray is checked for whether it has left the nearest MVUS (decision 106). If it has, that MVUS is removed from the queue (107). Then, after B, if geometry was returned by the traversal operation, a collision check is performed (108). If the ray collides with an object (decision 109), that object is made the nearest collision object if it is closer than the presently identified nearest object (110). Control then proceeds to C, where the current cell is scanned for any nested MVUS's that the ray hits (iteration 98).

The result of the process of the flowchart is the identification of the visual object in the scene that is struck by the ray.

The determined contacted object is then checked for transparency. If the object is transparent, its light filtering attributes are incorporated in a queue of transparent objects through which the ray passes, and the ray is traced and extended through the visual object as before, until it strikes another object, which is in turn examined for opacity and specularity, and processed as was the first.

If the point struck by the ray is on an opaque object, the color of that point is the color of the ray for determining the pixel image data. The color of a point is derived as the sum of two color values, (1) the color of light reflected from the point from direct illumination from light sources in the scene, plus (2) the color of light that is indirectly illuminating from the point from other illuminated objects.

The color of the reflected direct illumination is derived from the indicated BRDF for the visual object, the angle of viewing of the visual object at the point, and the angle of incident light at the point.

The example of FIG. 13 illustrates the process for determining the color of reflected direct illumination for a point on an opaque visual object. One of the rays used in the rendering, ray 95, is shown extending through a pixel in frame 93 and contacting the seat of chair 79 at point 97. The sole source of illumination for point 97 is light source 85 in the ceiling 87 of the scene 77. To assess how much light arrives at point 97 from this light source 85, a beam trace is made using a pyramidal frustrum beam generally indicated at 99, starting at point 97. This beam trace is used, in combination with graphics pipeline circuitry which is "tricked" into doing the calculations, to generate a raster pattern which represents the light source 85 as seen from point 97. The pipeline graphics hardware in the disclosed embodiment is preferably Open GL accelerator chips made by NVIDIA, but more efficient systems can be envisioned which are specifically designed and dedicated to this particular process.

The frustrum 99 is defined by four expanding edge lines 111, 113, 115 and 117 starting at point 97. The frustrum 99 is pyramidal, with a quadrilateral, preferably square, cross-section, as indicated by cross-section 119. The length of the side of the square of the cross-section of frustrum 99 in the area of the light source 85 is at least the maximum diagonal dimension of the quadrilateral light source 85 as seen from point 97.

Figure 23:
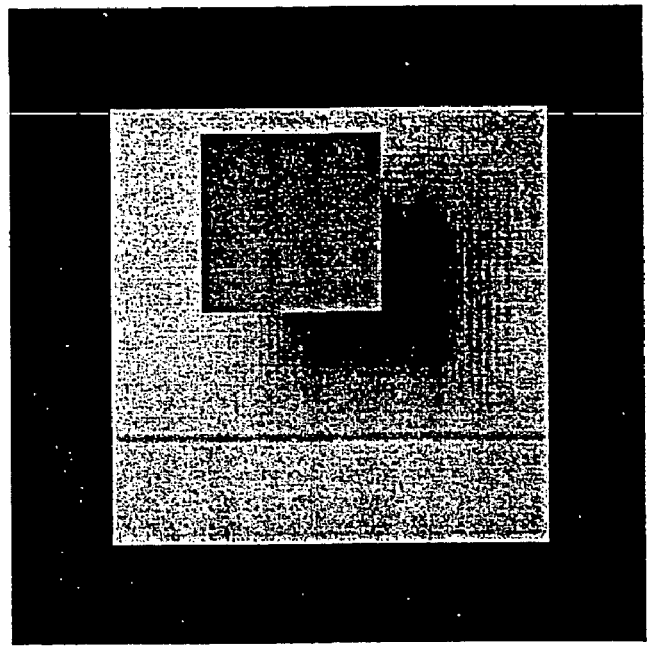
FIG. 23 shows a result of a rendering process according to the invention wherein the rasterized light pattern is prepared with the raster frame in the same orientation during all light source calculations.
Figure 24:
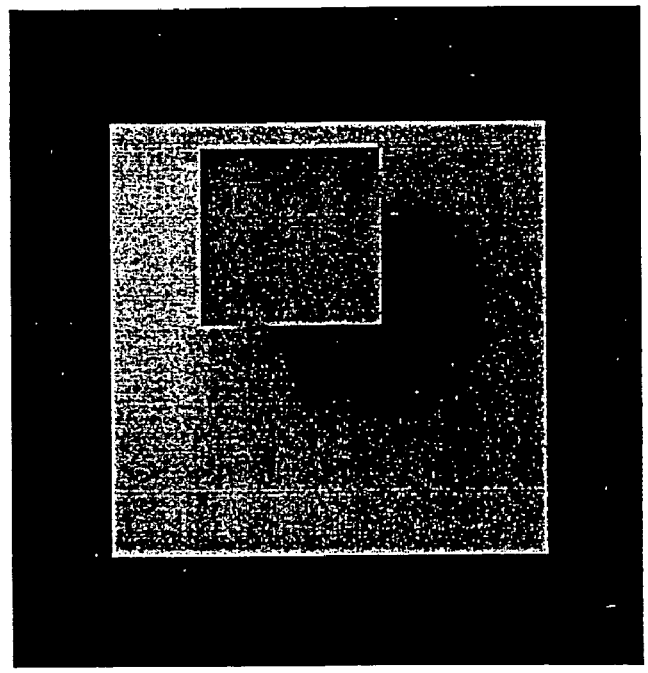
FIG. 24 shows a result of a rendering process according to the invention wherein the rasterized light pattern is rotated randomly before the raster processing.

As the frustrum is being defined, random angular orientation is imparted to the frustrum 99. The benefit of this random rotation may be seen in FIGS. 23 and 24. FIG. 23 shows a rendering wherein the light sources are calculated using a 16×16 rasterized light source calculation. With a uniform orientation of the frustrum, the rasterized representation of the light source intensity results in aliasing of the light intensity, which is ultimately visible as a rippling in the shadows. In contrast, FIG. 24 shows an image rendered using a 32×32 rasterization of the light source with a random rotation applied to the frustrum, resulting in a uniform shadow without ripples.

The rasterizing of each light source preferably makes use of graphics pipeline circuitry, taking advantage of certain computational steps that these circuits can perform very efficiently. Pipeline graphics circuits perform basically two types of functions very rapidly: (1) combining a raster image with a bit map, a process sometimes referred to as texture mapping; and (2) converting mathematical definitions of triangles into pixels (usually referred to as scan conversion). The present invention takes advantage of both these special capabilities.

Figure 14:
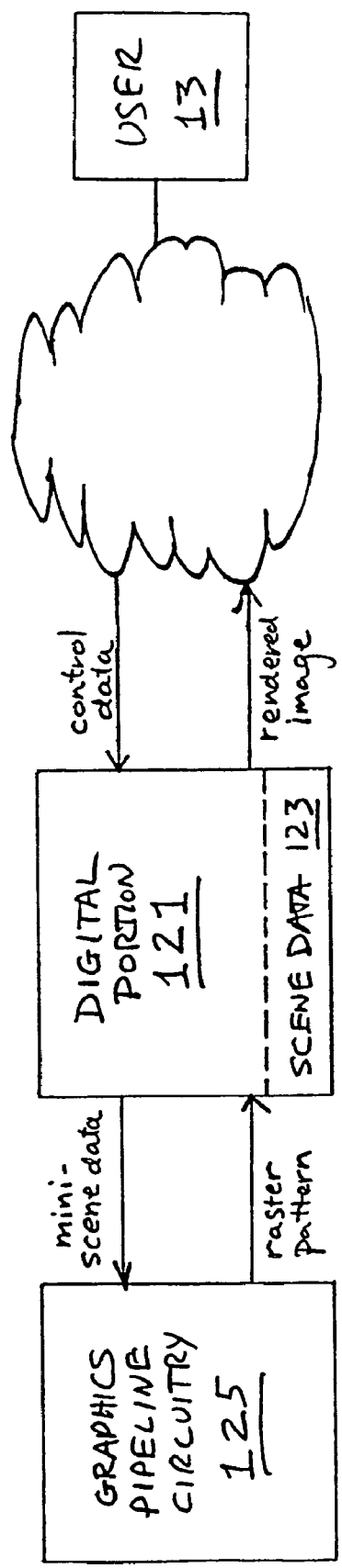
FIG. 14 is a diagram of the image generating system in which graphics pipeline circuitry is part of the image rendering system.

As best seen in FIG. 14, the hardware of the visualization system includes a digital portion 121 which receives the control data from, and transmits the image to, the user computer, as has been discussed above. The digital portion 121 also stores the 3D scene data indicated schematically at 123. The digital portion 121 is also wired to a hardware circuit 125, which is preferably a circuit comprising a set of pipeline graphics components, arranged to parallel-process data received from the digital portion 121.

The frustrum 99 is defined as described above by software running on the computer portion 121 of the visualization system. The computer portion 121 projects the frustrum as a beam through the MVUS scene space to ascertain what visual objects lie within the frustrum. The process for extending a beam is similar to that of extending a ray through the MVUS space. For a beam, however, some additional computation is required to identify all objects in its volume.

From the starting point, the apex of the frustrum, the dominant direction of the beam, i.e., the x, y, or z direction in which the beam proceeds most quickly is determined. The cross-section of the beam perpendicular to the dominant direction becomes the advancing front of the beam as it extends through the MVUS space. Every cell of the MVUS that falls wholly or partly in the beam is opened until the terminal sub-cell is reached, and a list of intersected cells containing geometry is kept as the beam goes through the MVUS structure.

When the list of cells falling partly or completely in the beam is obtained, the visual objects therein are collected and assembled into a "mini-scene" consisting only of the visual objects in the frustrum 99 and the light source being beam-traced.

Each light source is in the list of visual objects, and is defined as one or more triangles or quadrilaterals with three or four vertex points, an illumination intensity value, and, optionally, a pointer to an emission distribution function ("EDF") that defines the light source light emission pattern. The EDF is preferably a bit map that defines the pattern of the light source emissions. For example, an incandescent light bulb is brighter at its center where the filament is glowing. Similarly, fluorescent light panels usually show bands of brightness over the fluorescent bulbs therein. The EDF defines a bit map that expresses this variation in intensity.

The digital portion 121 transmits this mini-scene data to the hardware pipeline 125, together with the light source definition and its EDF, and a definition of the reflection point, i.e., the point 97 for which the amount of incident light is being determined and its reflective parameters (i.e., its BRDF). From this mini-scene data, the hardware 125 generates a raster light pattern, or, alternatively, a single luminance value, which is transmitted back to the digital portion 121. This raster which represents the direct illumination from light source 85 that is reflected from point 97 along the ray 95.

Figure 15:
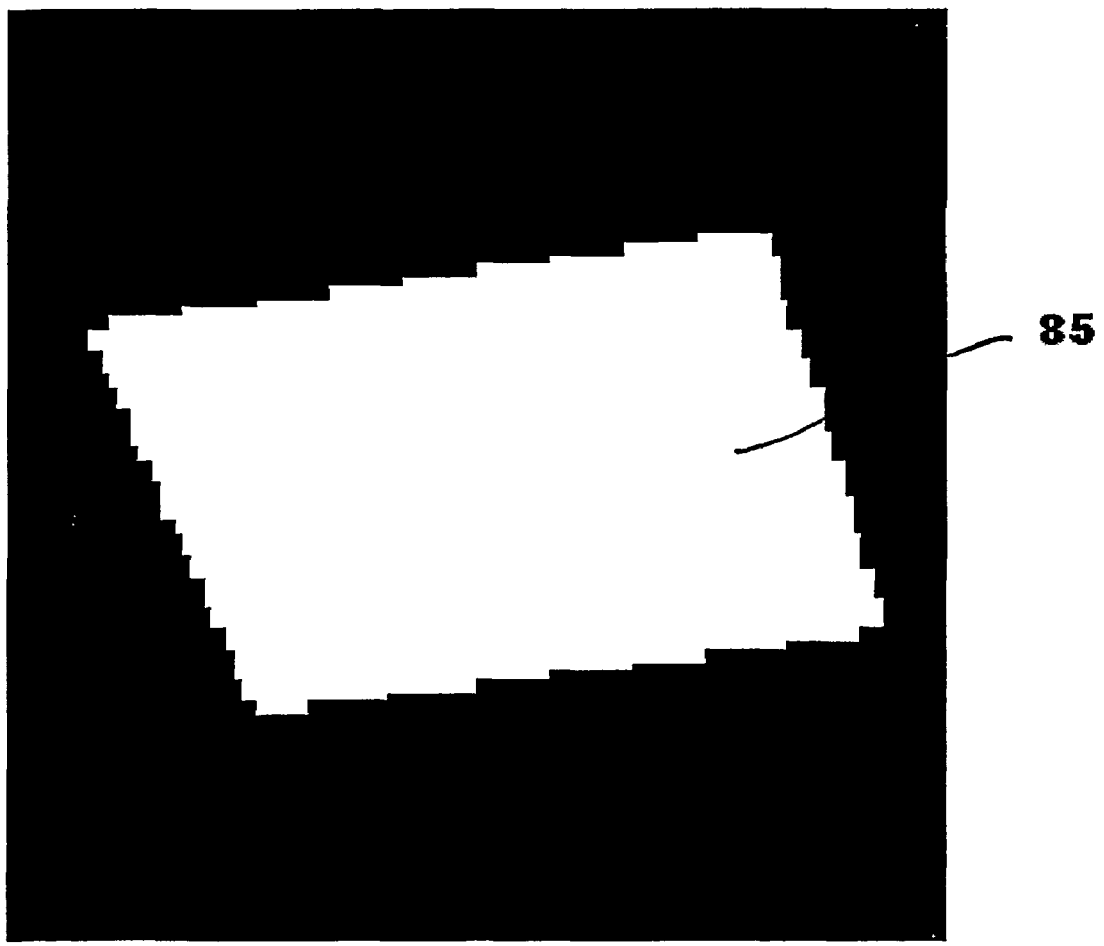
FIG. 15 shows a raster silhouette, the first step in the pipeline calculation for determining illumination of a point from the light source in FIG. 13.

In the pipeline circuit process performed by the hardware 125, the first step is defining a raster pattern which is a silhouette of the light source 85 in the frustrum 99 in a pure black and white pattern, as shown in FIG. 15. The raster pattern is preferably fairly coarse, e.g., 16×16 or 32×32 pixels. Greater raster resolution is preferably used, however, where the light source is at a very oblique angle relative to the cross section of the frustrum.

Figure 16:
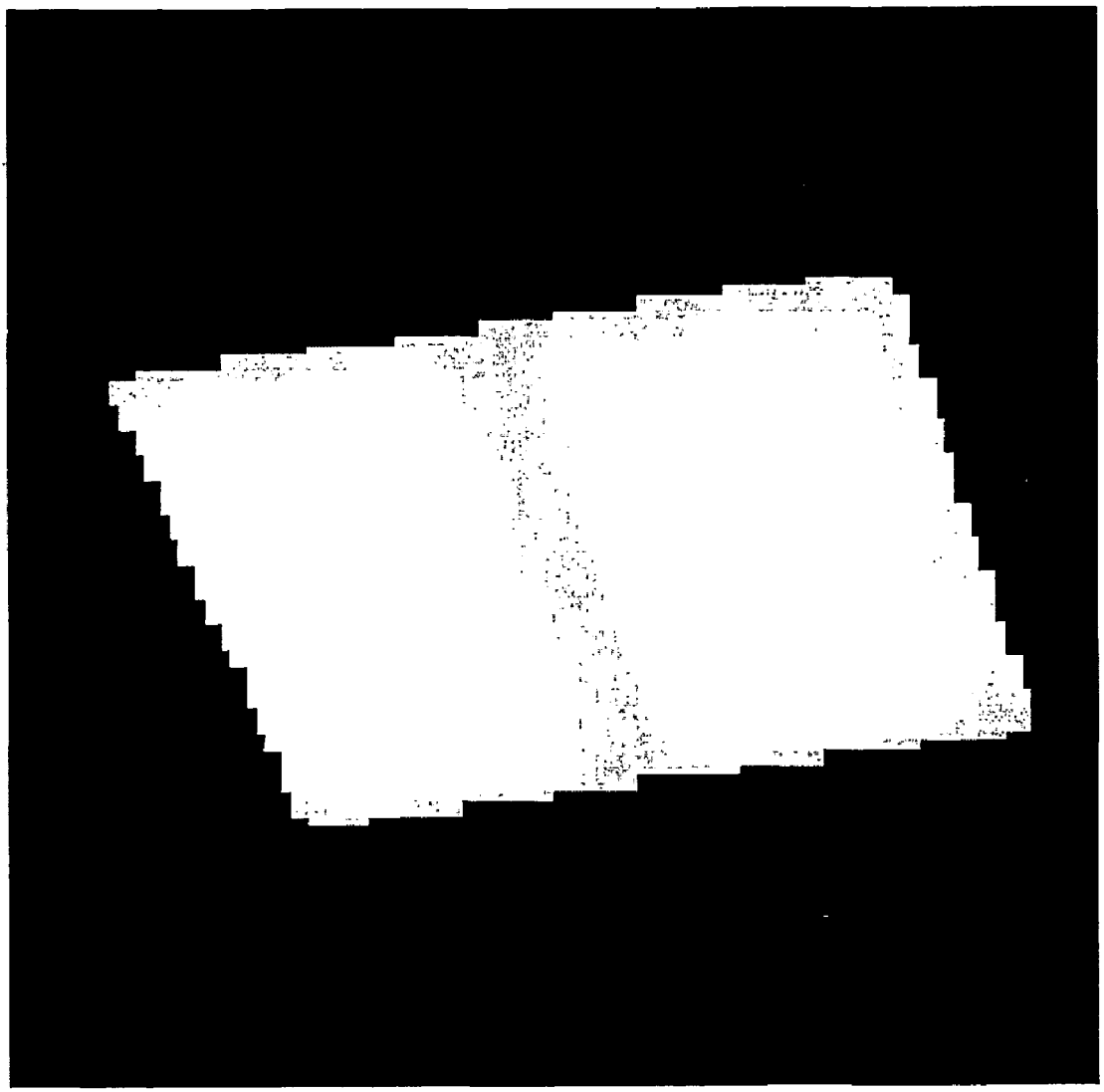
FIG. 16 shows a second step of the calculation, wherein an illumination texture is mapped on the light source silhouette of FIG. 14.

After the black and white silhouette is defined, the pipeline circuit combines the black and white silhouette (FIG. 15) with the relevant EDF, which is a bitmap that is part of the mini-scene data, and which is mapped onto the visual object of the light source. The combination of the EDF texture and the silhouette results in a raster pattern, such as is shown in FIG. 16, which represents the view of the light 85 from point 97 without any intervening obstructions.

Figure 17:
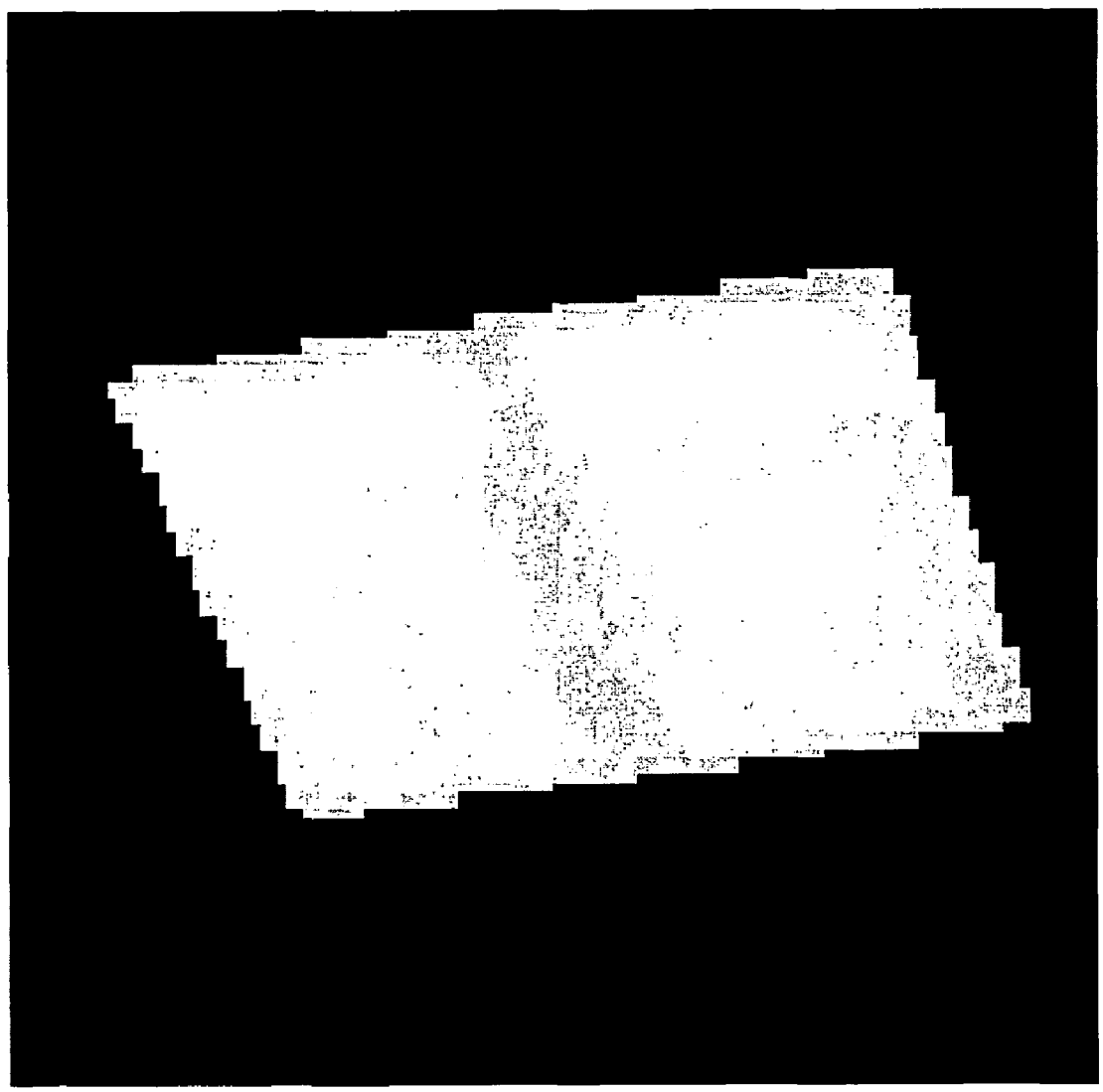
FIG. 17 shows a further step, wherein the effect of transparent objects is combined with the light source silhouette of FIG. 15.

The next step in the creation of the light-source raster pattern is that any transparent objects which intervene between the light source 85 and the point 97 are incorporated in the raster pattern. In the present example, this means the green glass top 81 of the table. The transparency of the object is defined as a fraction of the red, green, and blue components of light passing therethrough. Each of the occluded pixels of the raster pattern by this transparency fraction data is multiplied to yield the raster pattern shown in FIG. 17. Alternatively, the transparency may be a more complex transparency texture, defined procedurally or as a bitmap, mapped against the raster pattern.

Figure 18:
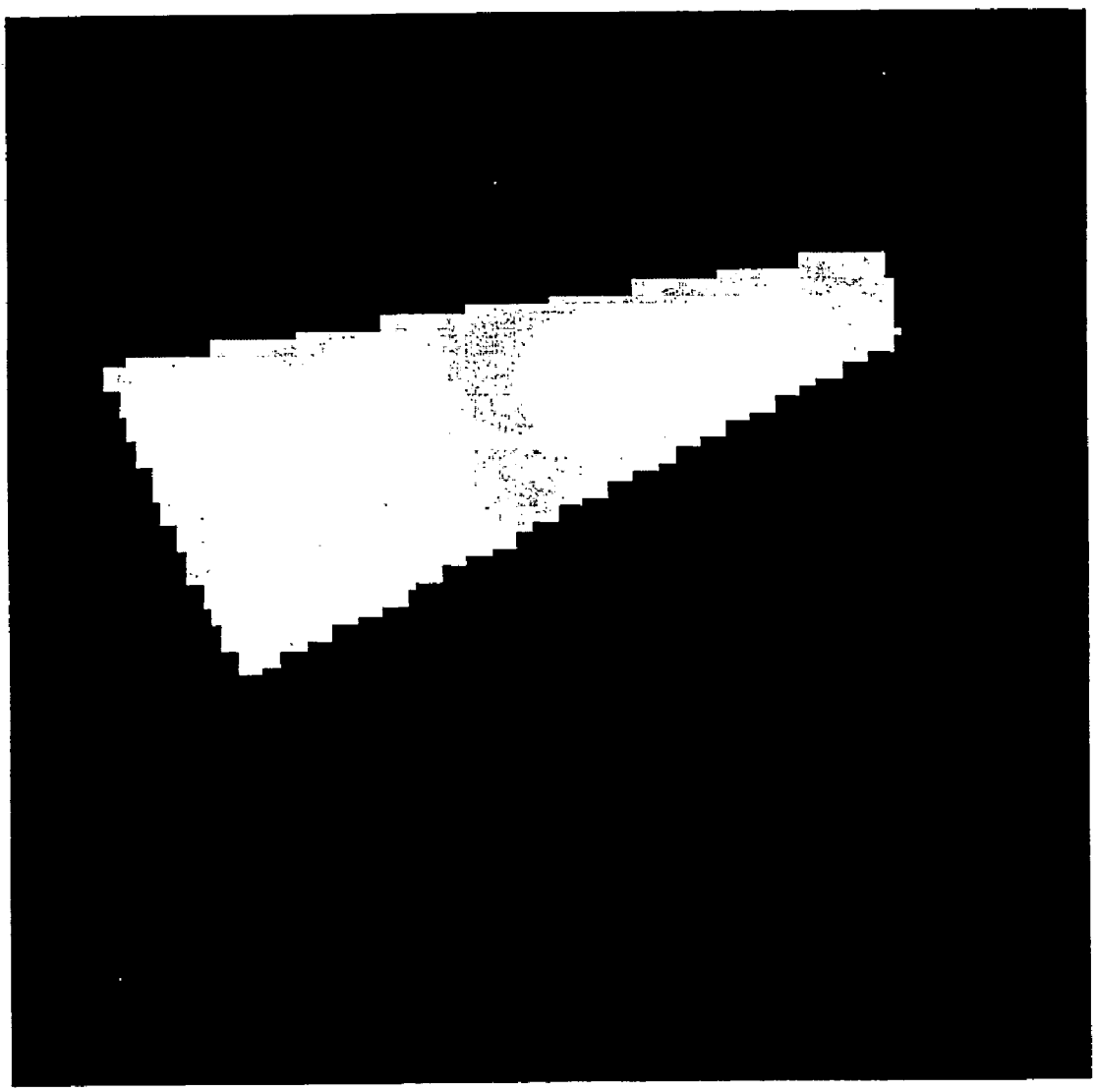
FIG. 18 shows the light source of FIG. 16, with occluding opaque intervening objects as viewed incorporated into the silhouette.

The next step in the formulation of the light-source raster pattern is determining the occlusion of the light source by any opaque objects, and blacking out any occluded pixels in the raster pattern. Such a raster pattern is shown in FIG. 18, wherein the occlusion of the opaque magazine 83 is blacked out of the raster pattern. The resulting raster pattern represents the view of the EDF textured light source, as viewed from the reflective point through any transparent objects, and/or blocked by any intervening opaque objects. This raster represents the light incident at the reflective point from the light source.

Once the incident light raster is created, the pipeline hardware 125 combines the incident light raster with the BRDF for the visual object to determine the light diffusely reflected from the reflective point.

The BRDF functions are derived and used based on a classical model of diffuse reflection. Classically, reflection is modeled using a polar coordinate system, illustrated in FIG. 19. According to this model, a visual object 130 has a reflecting point generally indicated at 131, and light L from a modeled light source 133 bounces off this point 131 to the viewed line of sight to point 131, such as, e.g., line R. The intensity and color of the reflected light is expressed as a reflectance value which is the fraction of incident light that is reflected along the line of sight.

Figure 19:
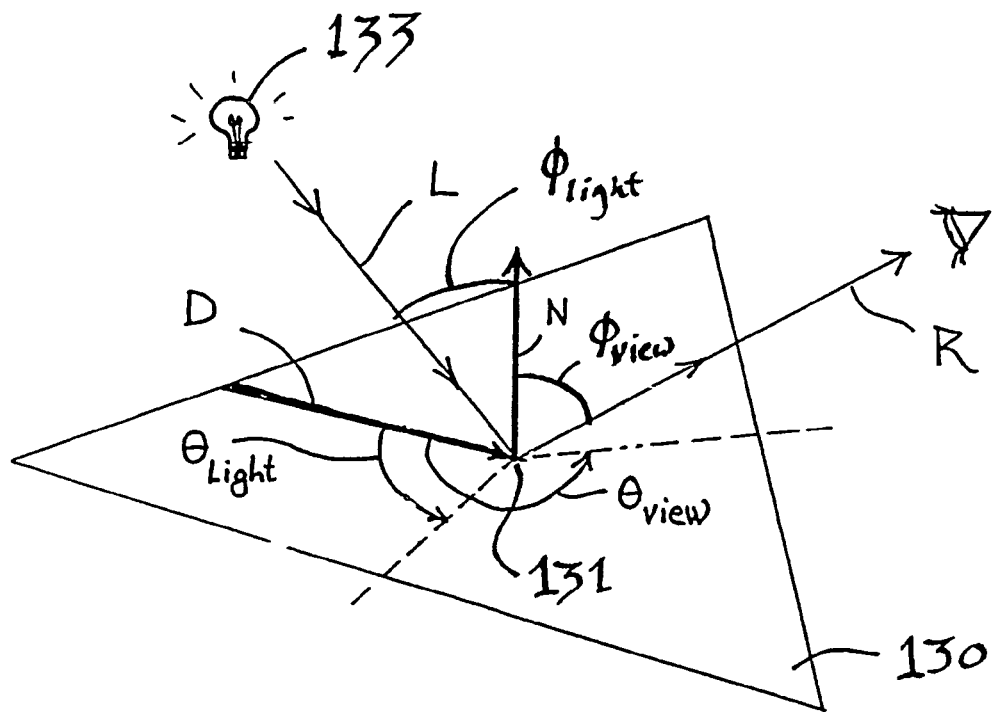
FIG. 19 illustrates the BRDF model of viewing of a reflected light or a visual object.

Some materials are anisotropic, such as, e.g., velvet, meaning that they have reflectance qualities that change depending on the angle that the material is rotated about a normal axis N. Isotropic materials on the other hand reflect the same intensity regardless of how they are rotated. As best seen in FIG. 19, to model reflectance of an anisotropic material, a direction reference vector D is defined for the material, and the rotative angle $\theta_{Light}$ of the incoming light vector L and the rotative angle $\theta_{view}$ of the reflectance viewing vector R are used to determine the intensity of the reflection.

Modeling of isotropic material is simpler. Effectively, $\theta_{Light}$ is considered to be zero degrees at all times, and $\theta_{View}$ is the angle between the incident light vector and the viewing vector.

In either type of material though, the azimuth angle $\phi_{Light}$ of the incoming light vector L and the azimuth angle $\phi_{view}$ of the reflected light being viewed are used to model the reflection of light.

Figure 20:
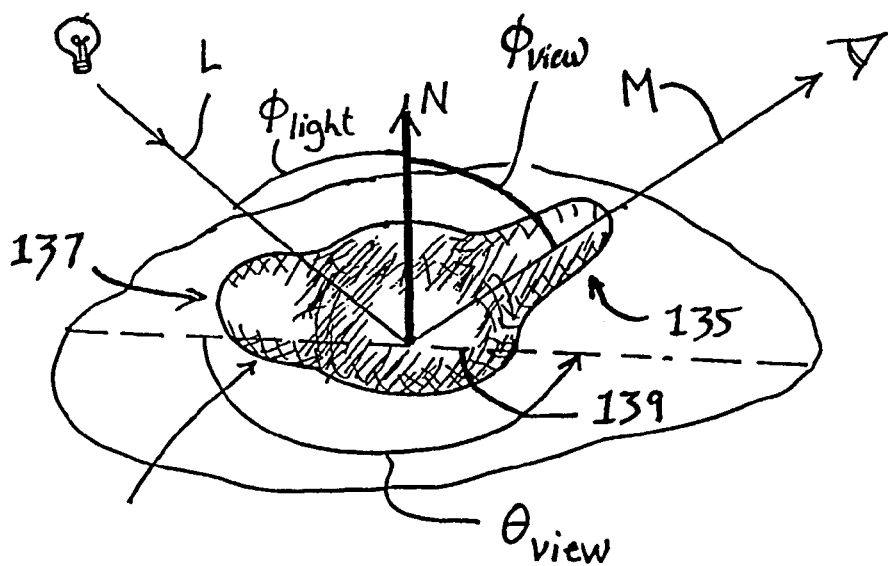
FIG. 20 is a diagram of reflected light intensity as a function of varying viewpoint.

Based on the angles $\phi_{Light}$, $\theta_{View}$, and $\phi_{View}$ (and $\theta_{Light}$ for anisotropic materials), the BRDF derives a reflectance value ranging from zero (no reflection) to one (100% reflection). An illustration of a usual distribution of reflectance values for a given incident light vector L is provided in FIG. 20. The shape of the surface shown is defined by the magnitude of the reflectance vector R over all the polar coordinate directions. Normally, maximum reflectance is centered around a specular angle or mirror angle M, where $\phi_{Light}=\phi_{View}$ and $\theta_{Light}=\theta_{View}-180°$. This maximum reflectance is seen as a bulge in reflectance values $K_R$ generally indicated at 135. There is also usually a bulge in values called backscatter or retroreflection generally indicated at 137, where $\theta_{Light}=\theta_{View}$ and $\phi_{view}<\phi_{Light}$. For most angles, though, the graph is a generally hemispherical middle portion 139, representing a generally uniform scattering of light, as in a Lambertian surface.

The BRDF function as used in the present invention follows this general model, but is preferably defined as data in the opposite direction, i.e., as a function of reflectance values for a given line of sight which vary over the field of various values of $\theta_{Light}$ and $\phi_{Light}$.

Figure 21A:
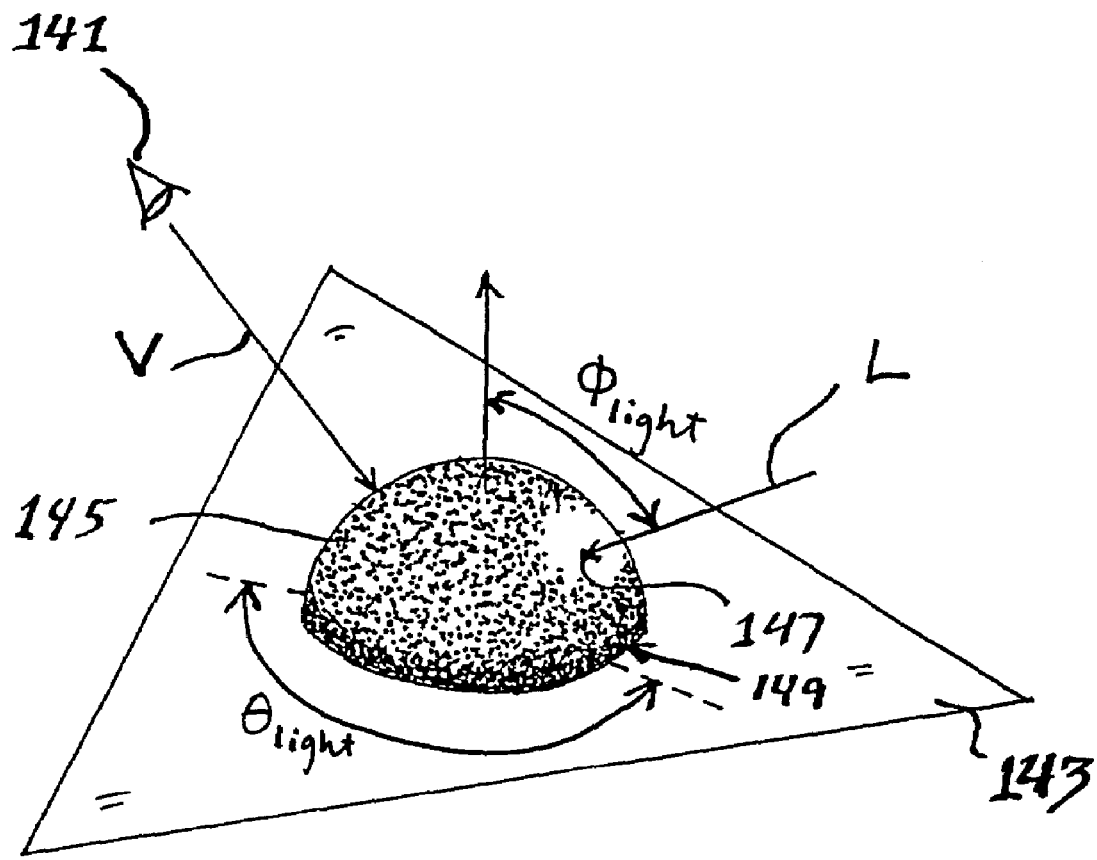
FIG. 21A shows the viewed intensity of reflected light as a function of varying angles of incident light from the light source, mapped onto a sphere surrounding the point of reflection.

This function is illustrated in FIG. 21A. A single point of view 141 sees a point on visual object 143 along line of sight V. A set of polar coordinate data is developed for reflection of light to the viewpoint dependent on the $\theta_{Light}$ and $\phi$Light for the incident ray. This data is illustrated as hemisphere 145. Each point on the hemisphere 145 represents a color value which is the fraction of white light passing through that point which would be reflected off the reflective point at the center of the hemisphere to be seen at the point of view 141.

For example, light arriving along ray L passes through point 147 of hemisphere 145. This point 147 is in a general region of the hemisphere 145 in which diffuse reflection is higher, i.e., around the mirror angle to the angle V of viewing. The ray therefore falls in a more light-colored spot of the hemisphere, indicating greater reflection of this particular ray. Rays striking at different points would be reflected at lesser degrees, which is indicated by the darker color of the hemisphere at those points. For example, a low angle incident light ray passing through point 147 contacts a darker point on hemisphere 145, meaning that the reflection of light of that ray to point of view 141 would be minimal.

This model also allows for modeling of tinted reflection, since each point on hemisphere 145 is a color value.

Figure 21B:
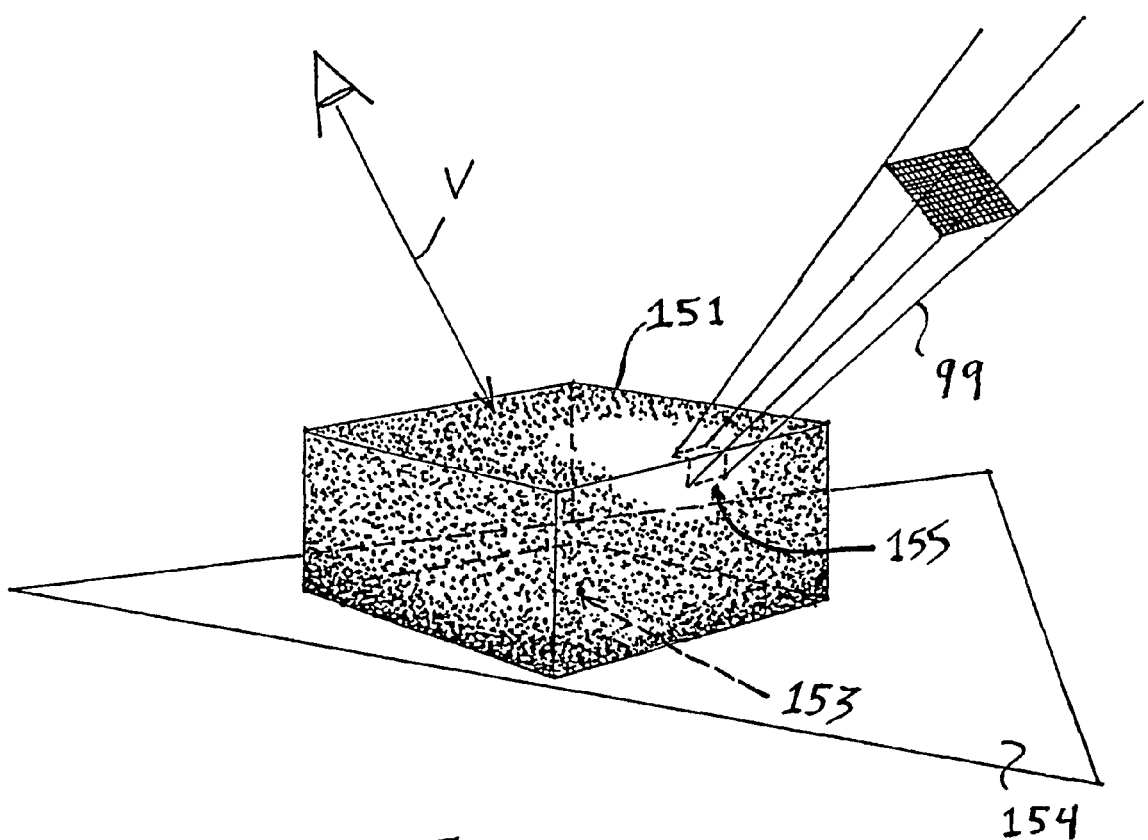
FIG. 21B shows the viewed intensity of reflected light as in FIG. 21A, but mapped onto a hemi-cube around the point of reflection.

To make the hemisphere 145 more readily usable in the present method, especially where graphics pipeline circuitry is used, the BRDF data for the point of view is converted not into a hemisphere, but into a hemicube 151 around the reflective point 153 on visual object 154 as illustrated in FIG. 21B. As with the hemisphere 145, each colored point of hemicube 153 represents the fraction of a ray of white light extending through that point and reflecting off point 153 that would be reflected to be viewed along line V.

In the rendering process, the hemicube 151 is used in the preparation of the rasterized data for illumination of a point by a light source. The BRDF identifier for the visual object struck by the rendering ray, such as the seat of the chain 79 in FIG. 13, identifies a set of hemicube texture maps, each representing roughly one degree of azimuth of the point of view relative to the visual object viewed. The angle of viewing the visual object and the BRDF identifier are used to select the proper BRDF hemicube texture map, and the resulting texture bitmap sheet is included as part of the mini-scene. When an anisotropic BRDF is required, both the azimuth and rotative angle of viewing are used to index into a set of textured BRDF hemicube maps to obtain the proper bitmap.

Figure 22A:
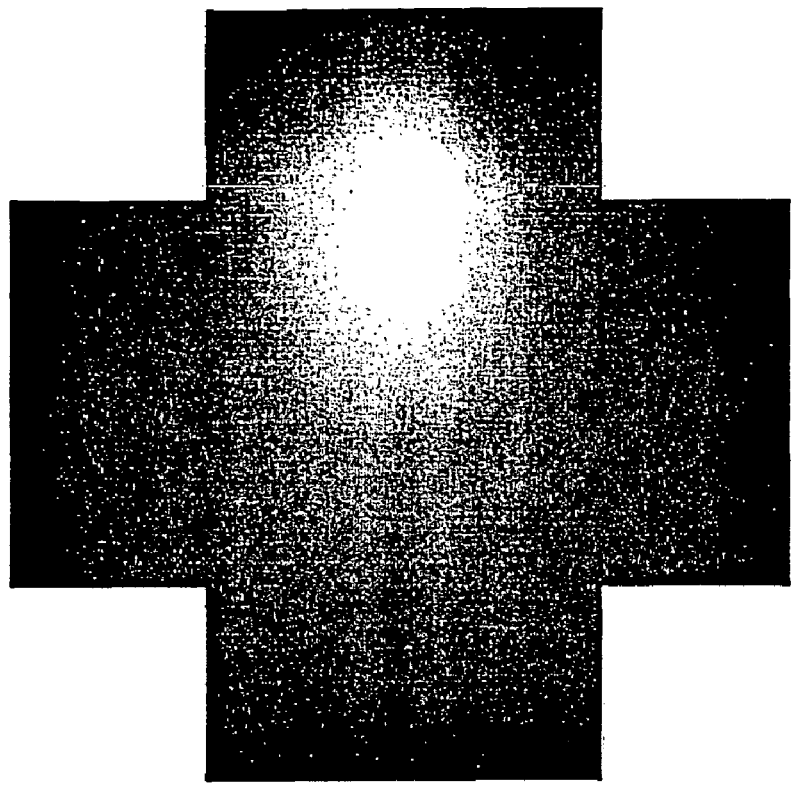
FIG. 22A shows the hemi-cube of FIG. 21B partially unfolded into a plane.
Figure 22B:
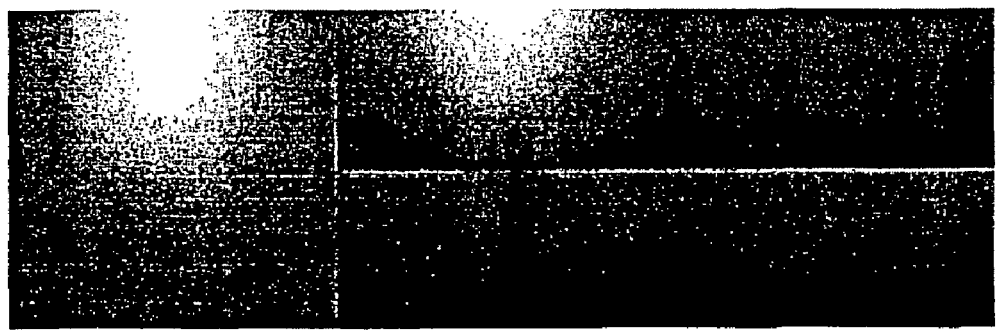
FIG. 22B shows the unfolded hemi-cube of FIG. 22A organized as a texture field for transmission to a graphics card.

FIGS. 22A and 22B show how this sheet is formed. FIG. 22A is the surface of the hemicube of FIG. 21B unfolded to lie in a plane. FIG. 22B is the organization of the parts of the unfolded hemicube as they are transmitted to the pipeline graphics circuitry. The format herein is particularly suitable for OpenGL graphics cards.

Figure 25:
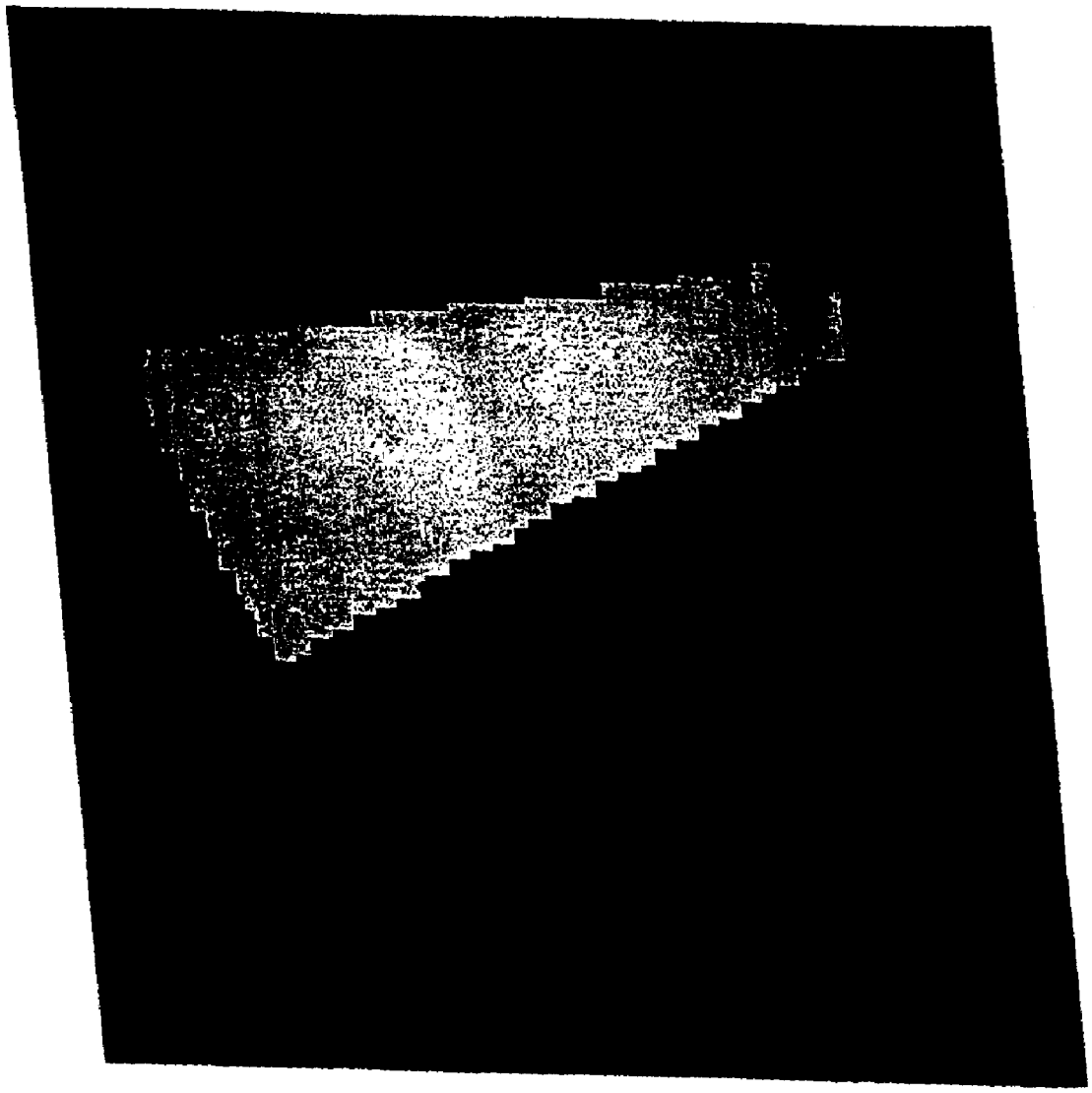
FIG. 25 shows the combination of the light source raster pattern of FIG. 17 with the reflection texture of the illuminated point, to yield the light for the point rendered.

In the miniscene data, the hemicube is assembled around the reflecting point, as in FIG. 21B. The frustrum 99 for the raster image of the light source extends through the hemicube 151, defining a relevant portion thereof, generally indicated at 155. The graphics circuitry combines the texture of this part of the hemicube with the assembled raster pattern of all other components of the miniscene (the raster pattern of FIG. 18) to yield the reflected raster pattern of FIG. 25.

This BRDF combined raster pattern represents the direct light that is reflected from the point 97. This raster may be returned to digital portion 121 as pixel data from the pipeline circuitry 125, or it may be returned as a single data value derived as the sum of all of the raster pixels.

In addition to reflection of direct light, the rendering process also takes into account reflection of other objects in the scene. The calculation of light reflection from these objects is performed by the digital portion 121 of the visualization computer. This calculation is preferably performed based generally on the Phong reflection model, which is well known in the prior art, and is discussed in, for example Phong, "lumination for Computer Generated Pictures", Communications of the ACM (CACM), Volume 18, Number 6, pp. 311–317, June 1975, which is herein incorporated by reference. The result is combined with the result of the light source rasterization to yield the color returned by the ray. If the object is specular (i.e. specular value not zero), the ray is extended in the mirror angle direction relative to the incoming ray striking the object. This specular ray is then extended onward through the MVUS grid to see if it strikes any other objects, either in the current box or outside it. If the ray actually leaves the box, the MVUS method discussed above is used to determine whether the ray enters another box containing visual objects. If the reflected ray hits an object either in the current box or another box, that object is also checked for transparency and specularity, and the process repeats.

If the object that the reflected ray strikes also is specular, the ray is again reflected at a specular angle and extended to the next object that it encounters. This specular reflection and tracing back continues for a limited number of reflections, e.g., four or five, because these reflections generally are of reducing intensity and brightness, and consequently have diminishing impact on the illumination of the first visual object struck by the ray. Each specular reflection is recorded as the color fraction of the specular light reflected and is kept as a running multiple of the reflections to this point. This reflected color fraction is derived from the BRDF field of the specular object, where the color of the relevant point on the relevant hemicube is recorded as the specular reflection fraction for the object.

Ultimately, the ray will hit a non-specular object, will hit a light source, will leave the scene space, or the number limit on reflections will be reached, and the ray will stop. If the ray hits an object, the color of the object is determined based on the method discussed above for determining reflection for light from light sources, and this resulting color is multiplied by the running multiple of the reflections, with the resulting product being the determined light color for the specular reflection. Similarly, where a light source is struck, the color of the point of the light source is multiplied by the running reflection multiple, and the result is returned as the reflection at the point of other objects. Otherwise, a zero (black) is returned, which has no effect on the color of the point.

The color from reflected objects is added to the color of reflected light sources, and the result is the color for the ray, which is then assigned as the pixel image data for the pixel in question, and combined (usually averaged) with other rays through the pixel to provide the color.

Figure 26:
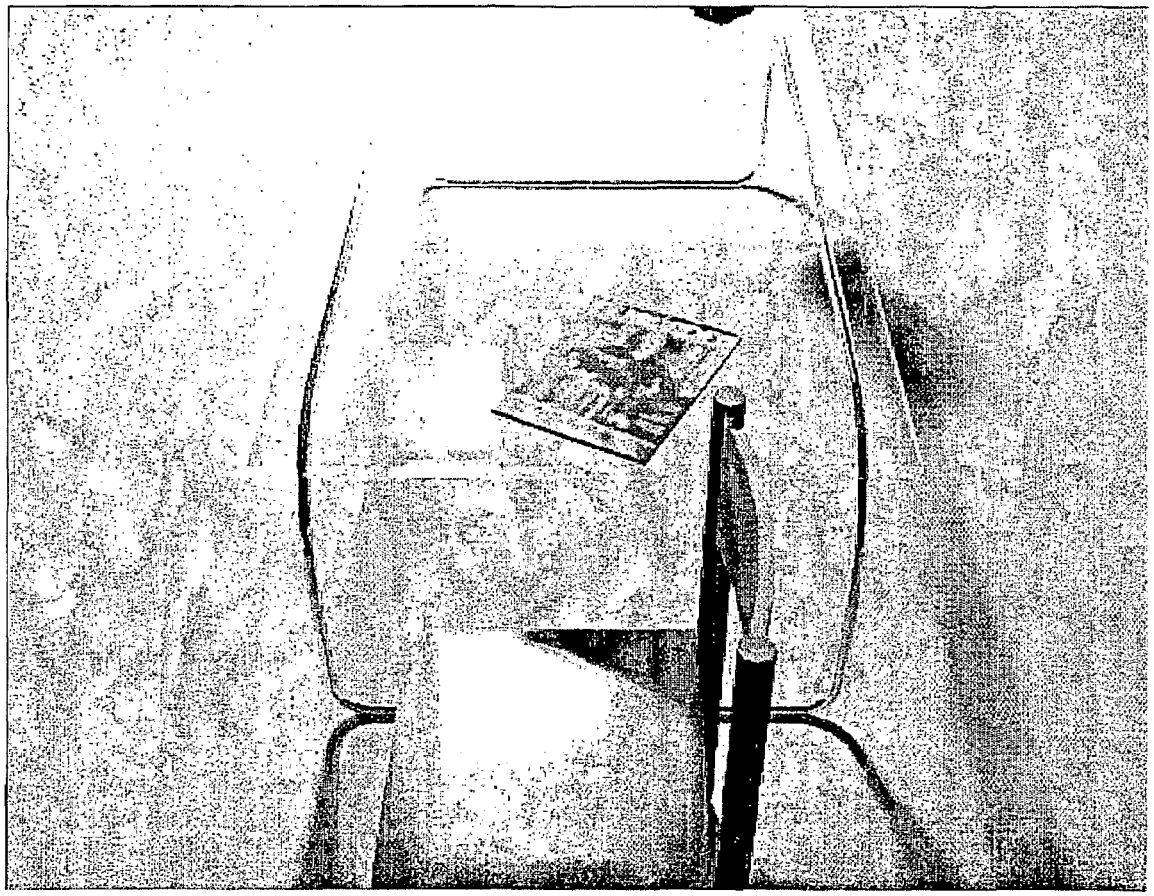
FIG. 26 shows a image rendered according to the invention from the scene of FIG. 13.

The ray tracing and rendering process is repeated for all pixels of the desired image, resulting in a realistic image, such as is shown in FIG. 26, the rendered image for the scene of FIG. 13.

It will be understood that, according to an aspect of the invention, the rendering of images is preferably done by the above rendering process and using MVUS scene data. However, the visualization system of the invention may also use a different rendering method. For example, an existing graphics pipeline system could be used to render the image transmitted to the user. Similarly, a conventional organization of scene data, such as a voxel grid or octree structure, can be used.

In addition, although MVUS scene data databases have herein been shown used with the foregoing rendering process, it should be understood that computer-accessible data storage devices storing MVUS scene databases can be used advantageously with other image generation processes and systems. Generally, the MVUS design can be used advantageously in any image generating system wherein the computer or computers extend a path (e.g., a ray or beam) through a scene and determine if it contacts any visual objects in the scene, or wherein the computer or computers locate objects within some spatial neighborhood around a point or location in the scene space.

For example, some rendering methods rely on a global illumination process to render images of the scene. As an example of such a process, a point viewed in the rendered image is identified and then its illumination is determined by casting 360 degrees by 90 degrees of rays or beams around the point and determining what visual objects or light sources those rays encounter. If the ray or beam hits another visual object, the illumination of that point is determined by the same 360 by 90 degrees casting of rays or beams. The process is repeated for any visual objects that those rays or beams hit, until each traced-back-illumination ray or beam meets a light source or leaves the scene, whereupon the total illumination of the viewed point is calculated. The casting of the rays or beams and the identification of the visual objects that lie therein in such a method can be efficiently accomplished using an MVUS scene database.

Also, a process relying on forward tracing may rely on an MVUS scene database. In forward tracing, each light source for the scene is identified, and the light projected therefrom is traced along a path through the scene. When the path contacts an object, reflected light is projected from the contacted point, and by repeating this process for all points struck by the illumination from the light sources the illumination of all visual objects in the scene is determined. Again, the MVUS database structure improves the efficiency of identifying the visual objects in the scene that lie in the paths of the light.

Still other rendering processes not mentioned here can make advantageous use of an MVUS scene database.

The MVUS database of the preferred embodiment is stored on a computer-accessible data storage device, as is well known to those of skill in the art. Preferred for this data storage is random access computer memory (RAM), since it allows for rapid recovery of data by the rendering computer system. The RAM may be any such computer memory devices, including SRAM or DRAM, and the database may be stored in a single computer system, or in two or more linked computer systems.

In the preferred embodiment, the MVUS database is stored using RAM memory, and access to this is accelerated using a content addressable memory (CAM) operating as a high-speed cache lookup of scene data without need to access the hash table. The CAM memory is generally smaller than the data stored in the hash table 43, so the CAM stores only the most recently accessed entries in the hash table, operating as a cache, i.e., less accessed data is dropped from the CAM as it fills up. The CAM is accessed by a content key made up of the values i, j, k and l for the MVUS partition being addressed. Such a CAM enhances the speed of the access to the scene data by an order of magnitude.

As a further option, where the computer system has a CAM memory that is large enough to store all the entries of the MVUS hash table 43, then all of the hash table entries may be loaded into CAM memory. In that case, the rendering application program will rely exclusively on the CAM to look up the MVUS database scene graph pointers and other pointers in the hash table entry, and the hash table 43 itself may be dispensed with.

Alternatively, because the MVUS data structure reduces the time needed to access the scene data, MVUS databases can be used advantageously in slower data storage hardware, such as, e.g., computer disk drives.

It should also be understood that the terms used herein should be considered terms of description rather than limitation, as those with this specification before them will be able to make variations and modifications to the disclosed methods and systems without departing from the spirit of the invention.

What is claimed is:

1. A method for storing in a computer-readable database scene data comprising electronic visual object data defining visual objects each having associated therewith electronic data identifying a location of the visual object in a virtual space, said method comprising:

a) determining from the electronic visual object data a number representing a count of the how many of the visual objects have locations within a cell in the virtual space;
   b) comparing said number of visual objects with a predetermined threshold subdivision value and/or a predetermined threshold multiple subdivision value;
   c) responsive to a determination that the number of visual objects in the cell exceeds the predetermined threshold subdivision value but not the predetermined threshold multiple subdivision value, performing a subdivision operation representing a partitioning of the cell in at least one dimension thereof into an integer subdivision number s of sub-cells that are equal in size to each other and together constitute the cell;
   d) responsive to a determination that the number of visual objects in the cell exceeds the predetermined threshold multiple subdivision value, performing a multiple subdivision operation representing a partitioning of the cell in at least one dimension thereof into a number of sub-cells, which number is an integral power, $s^n$, of subdivision number s, said sub-cells being equal in size to each other and together constituting the cell;
   e) responsive to a determination that the number of visual objects in the cell does not exceed the predetermined threshold subdivision value, storing data identifying the visual objects in the cell in the database so that the visual object data of said visual Objects can be accessed by a computer based on coordinates identifying said cell; and
   f) repeating steps (a) to (d) for each of the sub-cells created in steps (c) Of (d), wherein each sub-cell becomes the cell in step (a) for which the number of visual objects is counted.

2. A method according to claim 1, wherein the operations representing a partitioning of the cell arc of partitioning the cell in at least two dimensions thereof into s or $s^n$ sub-cells that are equal in size to each other and together constitute the cell.

3. A method according to claim 1, wherein the operations representing a partitioning of the cell are of partitioning the cell in three dimensions thereof into $s^3$ or $s^{3n}$ sub-cells that are equal in size to each other and together constitute the cell.

4. A method according to claim 1, wherein the subdivision number is 2.

5. A method according to claim 2, wherein the subdivision number is 2.

6. A method according to claim 3, wherein the subdivision number is 2, and where the subdivision operation yields eight sub-cells constituting the cell, and wherein the multiple subdivision operation yields $2^{3n}$ sub-cells of the cell.

7. A method according to claim 1, wherein said cell is identified by integer coordinates thereof, and each sub-cell thereof is identified by at least one coordinate derived by multiplying at least one of the coordinates of the cell by the subdivision number to obtain a product, and adding a non-negative integer number less than the subdivision number to the product as an indication of displacement from an edge of the cell.

8. A method according to claim 2, wherein said cell is identified by integer coordinates thereof, and each sub-cell thereof is identified by at least two coordinates derived by multiplying at least two of the coordinates of the cell by the subdivision number to obtain products, and adding a respective non-negative integer number less than the subdivision number to each product as an indication of displacement of the sub-cell from edges of the cell.

9. A method according to claim 3, wherein said cell is identified by three integer coordinates thereof, and each sub-cell thereof is identified by three coordinates derived by multiplying the coordinates of the cell by the subdivision number to obtain three products, and adding a respective non-negative integer number less than the subdivision number to each product as an indication of displacement of the sub-cell from edges of the cell.

10. A method according to claim 1, wherein the value of n in the multiple subdivision operation varies dependent on the number of visual objects in the cell.

11. A method according to claim 9, wherein the value of n in the multiple subdivision operation is calculated as directly proportional to the quantity:

$$\lceil \log_q(N/F) \rceil$$

where N is the number of objects in the cell, T is the subdivision threshold value, and $q=s^3$.

12. A method according to claim 7, wherein the data identifying the visual objects is stored so as to be accessed by the coordinates of the cell and a level number representing the number of subdivisions by the subdivision number between the cell and the first cell to which step (a) was applied in the method.

13. A method according to claim 12, wherein the data identifying visual objects is stored in a hash table structure accessed based on the coordinates and level number of the cell.

14. A method according to claim 12, wherein the data identifying visual objects comprises a stored pointer data value that points to another location in electronic data storage at which the visual object data can be located.

15. A method according to claim 12, wherein the data identifying visual objects is accessed by a content access memory using a key based on the coordinates and level number of the cell.

16. A method according to claim 1, wherein the visual object data of said visual objects is stored in a scene graph stored in the data storage device, and the data identifying the visual objects is a stored pointer value identifying at least one location in the scene graph.

17. A method according to claim 1, wherein the visual object data of said visual objects is stored in RAM memory.

18. A method according to claim 1, wherein one of the visual objects stored is identified by a pointer to another database of visual objects prepared according to the present method couple with data identifying a transform matrix that spatially orients cells of the second database of visual objects relative to the coordinates of the cell.

19. A method according to claim 1, wherein, when the operation of multiple subdivision is performed, a record is stored that represents the integral power n of the multiple subdivision.

20. A computer system for storing in a computer-readable data storage device a database of scene data comprising electronic visual object data defining visual objects each having associated therewith electronic data identifying a location of the visual object in a virtual space, said system comprising:

means for determining from the electronic visual object data a number representing a count of the how many of the visual objects have locations within a cell in the virtual space;

means for comparing said number of visual objects with a predetermined threshold subdivision value and/or a predetermined threshold multiple subdivision value;

means for performing, responsive to a determination that the number of visual objects in the cell exceeds the predetermined threshold subdivision value but not the predetermined threshold multiple subdivision value, a subdivision operation representing a partitioning of the cell in at least one dimension thereof into an integer subdivision number s of sub-cells that are equal in size to each other and together constitute the cell;

means for performing, responsive to a determination that the number of visual objects in the cell exceeds the predetermined threshold multiple subdivision value, a multiple subdivision operation representing a partitioning of the cell in at least one dimension thereof into a number of sub-cells, which number is an integral power, $s^n$, of subdivision number s, said sub-cells being equal in size to each other and together constituting the cell;

means for storing data identifying the visual objects in the cell in the database so that the visual object data of said visual objects can be accessed by a computer based on coordinates identifying said cell, said means for storing storing said data responsive to a determination that the number of visual objects in the cell does not exceed the predetermined threshold subdivision value, and means for providing to the means for determining, means for comparing, means for performing and means for storing each of the sub-cells created, said means for determining, means for comparing, means for performing and means for storing processing each sub-cell as the cell for which the number of visual objects is counted.

21. A system according to claim 20, wherein the operations representing a partitioning of the cell are of partitioning the cell in at least two dimensions thereof into s or $s^n$ sub-cells that are equal in size to each other and together constitute the cell.

22. A system according to claim 20, wherein the operations representing a partitioning of the cell are of partitioning the cell in three dimensions thereof into $s^3$ or $s^{3n}$ sub-cells that are equal in size to each other and together constitute the cell.

23. A system according to claim 20, wherein the subdivision number is 2.

24. A system according to claim 21, wherein the subdivision number is 2.

25. A system according to claim 22, wherein the subdivision number is 2, and where the subdivision operation yields eight sub-cells constituting the cell, and wherein the multiple subdivision operation yields $2^{3n}$ sub-cells of the cell.

26. A system according to 20, wherein said cell is identified by integer coordinates thereof, and each sub-cell thereof is identified by at least one coordinate derived by multiplying at least one of the coordinates of the cell by the subdivision number to obtain a product, and adding a non-negative integer number less than the subdivision number to the product as an indication of displacement from an edge of the cell.

27. A system according to 21, wherein said cell is identified by integer coordinates thereof, and each sub-cell thereof is identified by at least two coordinates derived by multiplying at least two of the coordinates of the cell by the subdivision number to obtain products, and adding a respective non-negative integer number less than the subdivision number to each product as an indication of displacement of the sub-cell from edges of the cell.

28. A system according to claim 22, wherein said cell is identified by three integer coordinates thereof, and each sub-cell thereof is identified by three coordinates derived by multiplying the coordinates of the cell by the subdivision number to obtain three products, and adding a respective non-negative integer number less than the subdivision number to each product as an indication of displacement of the sub-cell from edges of the cell.

29. A system according to 20, wherein the value of n in the multiple subdivision operation varies dependent on the number of visual objects in the cell.

30. A system according to claim 22, wherein the value of n in the multiple subdivision operation is calculated as directly proportional to the quantity:

$$\lceil \log_q(N/T) \rceil$$

where N is the number of objects in the cell, T is the subdivision threshold value, and $q=s^3$.

31. A system according to claim 26, wherein the means for storing stores the data identifying the visual objects so as to be accessed based on the coordinates of the cell and a level number representing the number of subdivisions by the subdivision number between the cell and the first cell to which subdivision or multiple subdivision was applied by the system.

32. A system according to claim 31, wherein means for storing includes data storage comprising a hash table structure in which the data identifying visual objects is stored so as to be accessed based on the coordinates and level number of the cell.

33. A system according to claim 31, wherein the data identifying visual objects comprises a stored pointer data value that points to another location in electronic data storage at which the visual object data can be located.

34. A system according to claim 31, wherein the means for storing stores the data identifying visual objects so as to be accessed by a content access memory using a key based on the coordinates and level number of the cell.

35. A system according to claim 20, wherein the means for storing stores the visual object data of said visual objects in a scene graph stored in the data storage device, and the data identifying the visual objects is a stored pointer value identifying at least one location in the scene graph.

36. A system according to claim 20, wherein the means for storing includes RAM memory storing the visual object data of said visual objects.

37. A system according to claim 20, wherein one of the visual objects stored is identified by a pointer to another database of visual objects coupled with data identifying a transform matrix that spatially orients cells of the second database of visual objects relative to the coordinates of the cell.

38. A system according to claim 20, and further comprising means for storing for the multiply subdivided cell a record that represents the integral power n of the multiple subdivision when the operation of multiple subdivision is performed.

39. A memory for storing scene data for access by a computer program being executed on a computer system, said scene data comprising data defining a plurality of visual objects each having a respective virtual location in a scene space, said memory comprising:

a plurality of cell data entries stored in said memory, each of said cell data entries corresponding to respective cell of the scene space, said cell being defined by coordinates thereof and a subdivision level value;

the cell data entries being stored in said memory so that each cell data entry is accessed based on the coordinates and level value of the associated cell;

said cell data entries each comprising data identifying the visual object or objects having a virtual location within the cell;

said cells being configured such that no more than a threshold subdivision number of visual objects have locations in any cell.

40. A memory according to claim 39, wherein the cells are defined as volumes of the scene space defined by integer boundaries of a coordinate grid, or as subdivisions derived therefrom, said subdivisions being derived by portioning a larger cell in at least one spatial dimension thereof by a positive integer subdivision number s of equally spaced partitions.

41. A memory according to claim 40, wherein the subdivisions are derived by partitioning in at least two dimensions.

42. A memory according to claim 40, wherein the subdivisions are derived by partitioning in three dimensions.

43. A memory according to claim 40, wherein the subdivision number s is 2.

44. A memory according to claim 41, wherein the subdivision number s is 2.

45. A memory according to claim 42, wherein the subdivision number s is 2.

46. A memory according to claim 40, wherein cells that have therein a number of visual objects that exceeds a multiple subdivision threshold number of visual objects are multiply subdivided by partitioning the cell in at least one dimension thereof into a number of sub-cells equal in size to each other, said number being an integral power, $s^n$, of Subdivision number s.

47. A memory according to claim 46, wherein the integer power n of multiple subdivision varies dependent upon the number of visual objects in the cell.

48. A memory according to claim 46, wherein the cell entry for a cell that is multiply subdivided includes data recording the value of the integer power n of multiple subdivision thereof.

49. A memory according to claim 39, wherein the cells are defined as volumes of the scene space defined by integer boundaries of a coordinate grid, or as subdivisions derived therefrom such that:

cells that have therein a number of visual objects that exceeds a subdivision threshold number of visual objects, being subdivided by partitioning a larger cell in each of three spatial dimensions thereof by a positive integer subdivision number s, or an integral power ($s^n$) thereof, of equally spaced partitions so as to yield $s^3$ or $s^{3n}$ subdivisions thereof, and cells that have therein a number of visual objects that exceeds a multiple subdivision threshold number of visual objects are multiply subdivided by partitioning the cell in three spatial dimensions thereof into a number of subdivisions equal in size to each other, said number being an integral power of subdivision number s.

50. A memory according to claim 49, wherein the subdivision number s is 2.

51. A memory according to claim 49, wherein the coordinates of each cell are:

a) coordinates of the associated grid position thereof; or
b) coordinates derived from the coordinates of a cell that was subdivided to yield the cell.

52. A memory according to claim 51, wherein the coordinates are derived by multiplying the coordinates of the subdivided cell by the number of cells that the subdivided cell was subdivided in each dimension.

53. A memory according to claim 40, wherein the level number of each cell represents the number of subdivisions into s partitions needed to reach the cell from the grid coordinate level, which is subdivision level zero.

54. A computer system having a memory according to claim 40, said computer system further comprising a tracing application program executable for identifying any of the visual objects of the scene data that lie in a defined region of scene space.

55. A computer system according to claim 54, wherein said defined region of scene space is a path therethough.

56. A computer system according to claim 54, wherein said defined region of scene space is a generally pyramidal beam extending therethrough.

57. A computer system according to claim 54, wherein said defined region of scene space is a generally linear ray extending therehough.

58. A method of rendering an image from scene data, said method comprising:

providing to a computer system access to a memory according o claim 40; and accessing said memory so as to identify any of the visual objects of the scene data that lie in a defined region of scene space.

59. A method according to claim 58, wherein said defined region of scene space is a path therethough.

60. A method according to claim 58, wherein said defined region of scene space is a generally pyramidal beam extending therethough.

61. A method according to claim 58, wherein said defined region of scene space is a generally linear ray extending therethough.

* * * * *